United States Patent
Nishikawa et al.

[11] Patent Number: 5,926,574
[45] Date of Patent: Jul. 20, 1999

[54] IMAGE ENCODING SYSTEM

[75] Inventors: Hirofumi Nishikawa; Takahiro Fukuhara; Kohtaro Asai; Tokumichi Murakami, all of Kanagawa, Japan

[73] Assignee: Mitsubishi Denki Kabushiki Kaisha, Tokyo, Japan

[21] Appl. No.: 08/705,530

[22] Filed: Aug. 29, 1996

[51] Int. Cl.$^6$ ............................................. H04N 7/30
[52] U.S. Cl. ................................. 382/239; 382/236
[58] Field of Search ................................. 382/236, 239, 382/268; 358/432–433

[56] References Cited

U.S. PATENT DOCUMENTS

| | | | |
|---|---|---|---|
| 4,951,140 | 8/1990 | Ueno et al. | 358/136 |
| 5,402,244 | 3/1995 | Kim | 358/261.2 |
| 5,432,555 | 7/1995 | Park | 358/404 |

FOREIGN PATENT DOCUMENTS

| | | |
|---|---|---|
| 0239076 | 9/1987 | European Pat. Off. . |
| 0267578 | 5/1988 | European Pat. Off. . |
| 0542474 | 5/1993 | European Pat. Off. . |
| 0586225 | 3/1994 | European Pat. Off. . |
| 0707427 | 4/1996 | European Pat. Off. . |
| 0753969 | 1/1997 | European Pat. Off. . |
| 4138517 | 5/1993 | Germany . |
| 4405803 | 8/1995 | Germany . |
| 3-179975 | 8/1991 | Japan . |
| 3-266564 | 11/1991 | Japan . |
| 3-285460 | 12/1991 | Japan . |

OTHER PUBLICATIONS

International Organization for Standarization Organization Coding of Moving Pictures and Associated Audio, K. Asai et al (2 pages).

Musmann, Hans Georg "Object–Oriented Analysis–Synthesis Coding of Moving Images," *Signal Processing: Image Communication*, vol. 1, No. 2 (Oct. 1989), pp. 117–138.

*Primary Examiner*—Thomas D. Lee
*Assistant Examiner*—Stephen Brinich

[57] ABSTRACT

In an image encoding system, an input image signal is blocked, the resultant blocks are transformed into two or more kinds of transformed coefficients, the transformed coefficients are quantized according to a given quantizing step size, the quantized transformed coefficients are scanned according to a plurality of scan sequences, the thus scanned coefficients are further encoded according to a plurality of encoding tables, and, out of combinations of the plurality of scan sequences with the plurality of encoding tables, a combination of a scan sequence with an encoding table which provides the highest encoding efficiency is selected by scan sequence and encoding table selector.

18 Claims, 22 Drawing Sheets

FIG. 16

PART 2

| 1 | 9 | 17 | 25 | 33 | 41 | 49 | 57 |
|---|---|----|----|----|----|----|----|
| 2 | 10 | 18 | 26 | 34 | 42 | 50 | 58 |
| 3 | 11 | 19 | 27 | 35 | 43 | 51 | 59 |
| 4 | 12 | 20 | 28 | 36 | 44 | 52 | 60 |
| 5 | 13 | 21 | 29 | 37 | 45 | 53 | 61 |
| 6 | 14 | 22 | 30 | 38 | 46 | 54 | 62 |
| 7 | 15 | 23 | 31 | 39 | 47 | 55 | 63 |
| 8 | 16 | 24 | 32 | 40 | 48 | 56 | 64 |

PART 1

| 1 | 2 | 6 | 7 | 15 | 16 | 28 | 29 |
|---|---|---|---|----|----|----|----|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

5, 0, 2, 0, 0, 1, 0, 0, 0, 1, (EOB)

(EOB) DESIGNATES AN ENCODING END SIGNAL EXPRESSING THAT ANY NON-ZERO COEFFICIENT IS NOT PRESENT AT ALL AFTER THIS POSITION (0, 5) (1, 2) (2, 1) (3, 1), (EOB)

VARIABLE-LENGTH ENCODING PROCESSING USING COMBINATIONS OF THE NUMBER OF ZEROS WITH THE SIZES OF COEFFICINTS

| 5 | 0 | 1 | 0 |
|---|---|---|---|
| 2 | 0 | 0 | 0 |
| 0 | 0 | 0 | 0 |
| 0 | 1 | 0 | 0 |

DCT COEFFICIENTS AFTER QUANTIZED

EXAMPLE OF SCAN SEQUENCE

| RUN | LEVEL | VARIABLE-LENGTH CODE |
|---|---|---|
| EOB | - | 0110 |
| 0 | 1 | 10s |
| 1 | 1 | 010s |
| 0 | 2 | 110s |
| 2 | 1 | 00101s |
| 0 | 3 | 0111s |
| 3 | 1 | 00111s |
| ...... | ...... | ............ |

EXAMPLE OF TABLES FOR VARIABLE-LENGTH ENCODING

IMAGE ENCODING SYSTEM

BACKGROUND OF THE INVENTION

1. Field of the Invention

The present invention relates to an image encoding system which encodes an image signal.

2. Description of the Related Art

FIG. 22 is a block diagram of a conventional image encoding device which is disclosed in, for example, a recommendation H.261 made by the International Telegraph and Telephone Advisory Committee ITU-T. In this image encoding device, an input image signal 201 is input into a differentiator 202; the differentiator 202 finds a difference between the input image signal 201 and a predictive signal 203 (which will be discussed later), and outputs a signal representing the difference as a predictive error signal 204; on receiving the predictive error signal, an orthogonally transforming part 205 transforms it from a space area to a frequency area and outputs the result to a quantizer 206; and, the quantizer 206 quantizes the outputs of the orthogonally transforming part 205 linearly, and then outputs the linearly quantized outputs as quantized data 207.

The quantized data 207 generated by the quantizer 206 is then diversified into two sections, one of which is encoded so that it can be transmitted to a receiving side. That is, one section of the quantized data 207 is encoded in an encoding part 209 in accordance with a table held in an encoding table 208, thereby providing encoded data 210. The other section of the quantized data 207 is reversely quantized in a reverse quantizer 211 and the result thereof is output to a reversely orthogonally transforming part 212. The reversely orthogonally transforming part 212 transforms the output of the reverse quantizer 211 from a frequency area to a space area and then outputs the result as a decoded predictive error signal 213 to an adder 214. The adder 214 adds the decoded predictive error signal 213 to the predictive error signal 203 to thereby obtain a decoded image signal 215, and then outputs the decoded image signal 215.

The decoded image signals 215 are stored collectively in a memory 216 such as a frame memory or the like. The memory 216 delays the decoded image signal stored therein and then outputs it as the decoded image signal 217 of a former frame to a predictive part 218. The predictive part 218 makes a motion compensation prediction by use of the input image signal 201 to be encoded and the frame delayed decoded image signal 217, and outputs the predictive signal 203 and a motion vector 219. The motion vector 219 is encoded by the encoding part 209, while the predictive signal 203 is transmitted to the above-mentioned differentiator 202 and adder 214.

However, since a conventional image encoding system is structured, for example, in the above-mentioned manner, it is difficult to encode an image signal in such a manner that the characteristics of the image signal are taken into proper account. Also, in the encoding part 209, generally, the image signals are encoded using a variable-length code but it is difficult to encode the image signals in such a manner as is best suitable for the incidence probabilities of the respective image signals. Further, when a plurality of target images to be encoded are present in an input image, it is impossible to perform individual encoding processings on the respective target images. Still further, it is also impossible that the target images are extracted from an input image and the extracted target images are encoded respectively using different encoding techniques to thereby build up a new image.

SUMMARY OF THE INVENTION

The present invention aims at soloing the above-mentioned problems still left in the conventional image encoding system. Accordingly, it is an object of the invention to provide an image encoding system in which, in order to realize an encoding processing which is suitable for the characteristics of an image signal, quantized data are encoded using two or more kinds of scan sequences and two or more kinds of encoding tables and, out of combinations of such scan sequences and encoding tables, there can be selected a proper combination of a scan sequence and an encoding table that is able to improve the encoding efficiency of an encoding operation using a variable-length code.

It is another object of the invention to provide an image encoding system in which, in order to execute different encoding processings on a plurality of target images on a screen, the target images are respectively encoded using different encoding techniques and also, in order to build up a new image, a plurality of target images are extracted from an input image and the extracted target images are respectively encoded using proper and different encoding techniques to thereby be able to realize a wide range of operations such as an operation to improve the quality of the entire screen, an operation to change the screen quality according to the target images, and other similar operations.

In accomplishing the above objects, according to a first aspect of the invention, there is provided an image encoding system in which, for example, quantized transformed coefficients are encoded using two or more kinds of scan sequences and two or more kinds of encoding tables, and, out of combinations of two or more kinds of scan sequences with two or more kinds of encoding tables, there can be selected a proper combination of a scan sequence with an encoding table, the image encoding system comprises the following elements:

(a) blocking means for dividing an input image signal into blocks each consisting of M pixels×N lines;

(b) transforming means for transforming the outputs of the blocking means, that is, the blocks into a plurality of transformed coefficients;

(c) quantizing means for the outputs of the transforming means, that is, the transformed coefficients;

(d) scan means for re-arranging the outputs of the quantizing means, that is, the quantized transformed coefficients into two or more kinds of scan sequences;

(e) encoding means for encoding the outputs of the scan means, that is, the scanned coefficients together with a plurality of coefficient values or encoding end signals using two or more kinds of encoding tables to thereby generate encoded data; and (f) select means for selecting a proper combination of a scan sequence and an encoding table in accordance with not only the two or more kinds of scan sequences generated by the scan means and but also the two or more pieces of encoded data generated by the encoding means.

According to a second aspect of the invention, there is provided an image encoding system as set forth in the first aspect of the invention, in which the encoded image is searched for a motion thereof to find a motion vector, the motion of the encoded image is compensated using the motion vector to obtain a predictive block, and a difference between the encoded image and the thus obtained predictive block is encoded.

According to a third aspect of the invention, there is provided an image encoding system as set forth in the first or second aspect of the invention, in which the quantized transformed coefficients are encoded according to combinations of two or more kinds of scan sequences with two or more kinds of encoding tables and are then all calculation processed to thereby provide their respective code amounts, and, out of these combinations, there is selected a combination of a scan sequence with an encoding table that gives the smallest or minimum code amount.

According to a fourth aspect of the invention, there is provided an image encoding system as set forth in the first or second aspect of the invention, in which a scan sequence and an encoding table are selected adaptively according to the level distributions of the transformed coefficients consisting of the outputs of the transforming means.

According to a fifth aspect of the invention, there is provided an image encoding system as set forth in the first or second aspect of the invention, in which a scan sequence is selected adaptively according to the level distributions of the transformed coefficients, the transformed coefficients are encoded using the selected scan sequence and a plurality of encoding tables and are then all calculation processed to provide their respective code amounts, and there is selected an encoding table which gives the smallest code amount.

According to a sixth aspect of the invention, there is provided an image encoding system as set forth in the first or second aspect of the invention, in which an encoding table is selected adaptively according to the level distributions of the transformed coefficients, the transformed coefficients are encoded using the selected encoding table and a plurality of scan sequences and are then all calculation processed to provide their respective code amounts, and there is selected a scan sequence which gives the smallest code amount.

According to a seventh aspect of the invention, there is provided an image encoding system as set forth in the first or second aspect of the invention, in which a scan sequence and an encoding table are selected adaptively according to quantizing step sizes.

According to an eighth aspect of the invention, there is provided an image encoding system as set forth in the first or second aspect of the invention, in which a scan sequence is selected adaptively according to the quantizing step sizes, the transformed coefficients are encoded using the selected scan sequence and a plurality of encoding tables and are then all calculation processed to provide their respective code amounts, and there is selected an encoding table which gives the smallest code amount.

According to a ninth aspect of the invention, there is provided an image encoding system as set forth in the first or second aspect of the invention, in which an encoding table is selected adaptively according to the quantizing step sizes, the transformed coefficients are encoded according to the selected encoding table and a plurality of scan sequences and are then all calculation processed to provide their respective code amounts, and a scan sequence and an encoding table are selected adaptively in accordance with the motion vector to be searched for the motion compensation of the encoded image in order to be able to select a scan sequence which gives the smallest code amount.

According to a tenth aspect of the invention, there is provided an image encoding system as set forth in the second aspect of the invention, in which the select means for selecting a scan sequence and an encoding table switches the scan sequences and encoding tables adaptively in accordance with the motion vector to be searched for compensation of the motion of the encoded image.

According to an eleventh aspect of the invention, there is provided an image encoding system as set forth in the second aspect of the invention, in which a scan sequence is selected adaptively according to the motion vectors to be searched for the motion compensation of the encoded image, the quantized transformed coefficients are encoded according to the selected scan sequence and a plurality of encoding tables are then all calculation processed to provide their respective code amounts, and there is selected an encoding table which gives the smallest code amount.

According to a twelfth aspect of the invention, there is provided an image encoding system as set forth in the second aspect of the invention, in which an encoding table is selected adaptively according to the motion vector to be searched for the motion compensation of the encoded image, the quantized transformed coefficients are encoded according to the selected encoding table and a plurality of scan sequences are then all calculation processed to provide their respective code amounts, and there is selected a scan sequence which gives the smallest code amount.

According to a thirteenth of the invention, there is provided an image encoding system as set forth in the first and second aspects of the invention, in which a scan sequence and an encoding table are selected adaptively according to the encoding types of the encoding blocks.

According to a fourteenth aspect of the invention, there is provided an image encoding system as set forth in the first and second aspects of the invention, in which a scan sequence is selected adaptively according to the encoding types of the encoding blocks, the quantized transformed coefficients are encoded according to the selected scan sequence and a plurality of encoding tables are then all calculation processed to provide their respective code amounts, and there is selected an encoding table which gives the smallest code amount.

According to a fifteenth aspect of the invention, there is provided an image encoding system as set forth in the first and second aspects of the invention, in which an encoding table is selected adaptively according to the encoding types of the encoding blocks, the quantized transformed coefficients are encoded according to the selected encoding table and a plurality of scan sequences are then all calculation processed to provide their respective code amounts, and there is selected a scan sequence which gives the smallest code amount.

According to a sixteenth aspect of the invention, there is provided an image encoding system as set forth in the first to fifteenth aspects of the invention, in which the plurality of scan sequences includes a scan sequence in which the quantized transformed coefficients are arranged in the sequence of the lower frequency components thereof toward the higher frequency components thereof.

According to a seventeenth aspect of the invention, there is provided an image encoding system which extracts a plurality of target images included in an input image, encodes the extracted target images according to an encoding technique suitable for the extracted target images, and outputs the encoding information on the present encoding processing and the information representing a decoding technique for decoding the encoded target images, and also which includes the following elements:

(g) target image extract means for extracting a plurality of target images included in an input image;

(h) encoding technique decide means for deciding an encoding technique to encode the extracted target images; and (i) encoding means for outputting not only the encoding information on the encoding processing performed when the respective target images are encoded using the decided encoding technique and but also the information representing a decoding technique for decoding the encoded target images.

According to an eighteenth aspect of the invention, there is provided an image encoding system as set forth in the seventeenth aspect of the invention, which comprises: target image extract means composed of an edge detector for detecting the edge information of the input image and an area divider for dividing the area of the input image in accordance with the detected edge information to obtain a plurality of area divisional images; encoding technique decide means composed of a statistical property detector for detecting the image statistical properties of the target images and an encoding decide device for outputting encoder select information in accordance with the detected statistical property information; and encoding means composed of a plurality of encoders and encoder select means for inputting therein the encoder select information to select an encoder.

According to an image encoding system as set forth in the first aspect of the invention, since the quantized transformed coefficients are re-arranged in a plurality of scan sequences and are then encoded using two or more kinds of encoding tables, it is possible to realize an encoding processing which is suitable for the characteristics of an input image signal and, especially when the quantized transformed coefficients are encoded together with a plurality of coefficient values or encoding end signals into variable-length codes, it is possible to realize an encoding processing which is ideal for the incidence probabilities of the codes.

According to an image encoding system as set forth in the second aspect of the invention, since the differential image with the motion thereof compensated is transformed and encoded, the encoding efficiency can be improved.

According to an image encoding system as set forth in the third aspect of the invention, the quantized transformed coefficients are encoded according to combinations of two or more scan sequences with two or more kinds of encoding tables, the encoded outputs are all calculation processed to thereby provide their respective code amounts, and there is selected a combination of a scan sequence with an encoding table which shows the smallest code amount. This makes it possible not only to select a combination of a scan sequence and an encoding table which can provide the best encoding efficiency, but also to minimize the required code amount.

According to an image encoding system as set in the fourth aspect of the invention, because a scan sequence and an encoding table are selected according to the level distributions of the quantized transformed coefficients, it is possible to select a scan sequence and an encoding table which are best suitable for the signal characteristics of an input image signal or a predictive error signal, which in turn makes it possible to improve the encoding efficiency of the input image signal or predictive error signal.

According to an image encoding system as set in the fifth aspect of the invention, due to the fact that a scan sequence is selected according to the level distributions of the quantized transformed coefficients, the quantized transformed coefficients are encoded according to the selected scan sequence and a plurality of encoding tables, the encoded outputs are all calculation processed to provide their respective code amounts, and there is selected an encoding table which gives the smallest code amount, it is possible to improve the encoding efficiency of an input image signal or a predictive error signal with less pieces of hardware when compared with the fourth aspect of the invention.

According to an image encoding system as set forth in the sixth aspect of the invention, since an encoding table is selected according to the level distributions of the quantized transformed coefficients, the quantized transformed coefficients are encoded according to the selected encoding table and a plurality of scan sequences, the encoded outputs are all calculation processed to provide their respective code amounts, and there is selected a scan sequences which gives the smallest code amount, it is possible to improve the encoding efficiency of an input image signal or a predictive error signal with less pieces of hardware when compared with the fourth and fifth aspects of the invention.

According to an image encoding system as set forth in the seventh aspect of the invention, because a scan sequence and an encoding table are selected in accordance with the quantizing step sizes with respect to the transformed coefficients, it is possible to select a scan sequence and an encoding table which are best suitable for the quantizing characteristics of the quantized transformed coefficients, which in turn makes it possible to improve an encoding efficiency with respect to a given quantizing step size.

According to an image encoding system as set forth in the eighth aspect of the invention, due to the fact that a scan sequence is selected in accordance with the quantizing step sizes with respect to the transformed coefficients, the quantized transformed coefficients are encoded according to the selected scan sequence and a plurality of encoding tables, the encoded outputs are all calculation processed to provide their respective code amounts, and there is selected an encoding table which gives the smallest code amount, it is possible to improve an encoding efficiency with respect to the quantizing step sizes with less pieces of hardware when compared with the fifth aspect of the invention.

According to an image encoding system as set forth in the ninth aspect of the invention, since an encoding table is selected in accordance with the quantizing step sizes with respect to the transformed coefficients, the quantized transformed coefficients are encoded according to the selected encoded table and a plurality of scan sequences, the encoded outputs are all calculation processed to provide their respective code amounts, and there is selected a scan sequence which gives the smallest code amount, it is possible to improve an encoding efficiency with respect to the quantizing step sizes with less pieces of hardware when compared with the fifth and eighth aspects of the invention.

According to an image encoding system as set forth in the tenth aspect of the invention, because a scan sequence and an encoding table are selected in accordance with a motion vector which is calculated for compensation of the motion of an encoded image, it is possible to select the best suitable scan sequence and encoding table according to the motion of such encoded image, which in turn makes it possible to improve an encoding efficiency with respect to the motion of such encoded image.

According to an image encoding system as set forth in the eleventh aspect of the invention, due to the fact that a scan sequence is selected in accordance with a motion vector which is calculated for compensation of the motion of an encoded image, the quantized transformed coefficients are encoded according to the selected scan sequence and a plurality of encoding tables, the encoded outputs are all calculation processed to provide their respective code amounts, and there is selected an encoding table which gives the smallest code amount, it is possible to improve an encoding efficiency with respect to the motion of such encoded image with less pieces of hardware when compared with the tenth aspect of invention.

According to an image encoding system as set forth in the twelfth aspect of the invention, because an encoding table is selected according to a motion vector which is calculated for compensation of the motion of an encoded image, the quantized transformed coefficients are encoded according to the selected encoded table and two or more kinds of scan sequences, the encoded outputs are all calculation processed to provide their respective code amounts, and there is selected a scan sequence which gives the smallest code amount, it is possible to improve an encoding efficiency with respect to the motion of such encoded image with less pieces of hardware when compared with the tenth and eleventh aspects of the invention.

According to an image encoding system as set forth in the thirteenth aspect of the invention, since a scan sequence and an encoding table are selected in accordance with the encoding types of the encoding blocks, it is possible to select a scan sequence and an encoding table which are best suitable for the encoding types of the encoding blocks, thereby being able to improve an encoding efficiency.

According to an image encoding system as set forth in the fourteenth aspect of the invention, due to the fact that a scan sequence is selected according to the encoding types of encoding blocks, the quantized transformed coefficients are encoded according to the selected scan sequence and a plurality of encoding tables, the encoded outputs are all calculation processed to provide their respective code amounts, and there is selected an encoding table which gives the smallest code amount, it is possible to improve an encoding efficiency with respect to the encoding types with less pieces of hardware when compared with the thirteenth aspect of the invention.

According to an image encoding system as set forth in the fifteenth aspect of the invention, since an encoding table is selected in accordance with the encoding types of the encoding blocks, the quantized transformed coefficients are encoded according to the selected encoded table and two or more kinds of scan sequences, the encoded outputs are all calculation processed to provide their respective code amounts, and there is selected a scan sequence which gives the smallest code amount, it is possible to improve an encoding efficiency with respect to the encoding types with less pieces of hardware when compared with the thirteenth and fourteenth aspects of the invention.

According to an image encoding system as set forth in the sixteenth aspect of the invention, a plurality of scan sequences includes a scan sequence in which the quantized transformed coefficients are arranged in the sequence of the lower frequency components thereof toward the higher frequency components thereof. This makes it possible to scan the transformed coefficients with high efficiency.

According to an image encoding system as set forth in the seventeenth aspect of the invention, due to the fact that a plurality of target images contained in an input image are extracted, the extracted target images are encoded according to encoding techniques which are respectively suitable for them, and the encoding information on the present encoding processing and the information showing a technique to decode the encoded target images are output, it is possible to improve the quality of the image when compared with an image encoding system in which the whole screen is encoded using the same encoding technique, and it is also possible to carry out operations such as an operation to change the image quality according to the target images and other similar operations.

According to an image encoding system as set forth in the eighteenth aspect of the invention, the image encoding system comprises: target image extract means composed of an edge detector for detecting the edge information of an input image, and an area divider for dividing the area of the input image according to the detected edge information to thereby obtain a plurality of area divisional images; encoding technique decide means composed of a statistical property detector for detecting the image statistical properties of the target images, and encoding technique decide device for outputting encoder select information in accordance with the thus detected statistical property information; and, encoding means composed of a plurality of encoders, and encoder select means for inputting the encoder select information therein to thereby select an encoder. According to this structure, since the image area is divided according to the image edge information, the image area can be divided with high accuracy, and also because the encoding technique is decided based on the statistical properties of the image, it is possible to select a highly efficient encoding technique.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 16 is a block diagram of an example of the structure of an encoding part employed in an image encoding system according to an embodiment 15 of the invention;

FIG. 17 is an explanatory view of an example of a variable-length encoding processing;

DETAILED DESCRIPTION OF THE PREFERRED EMBODIMENTS

Now, a description will be given in more detail of embodiments of the invention with reference to the accompanying drawings.

Embodiment 1

Figure 1:
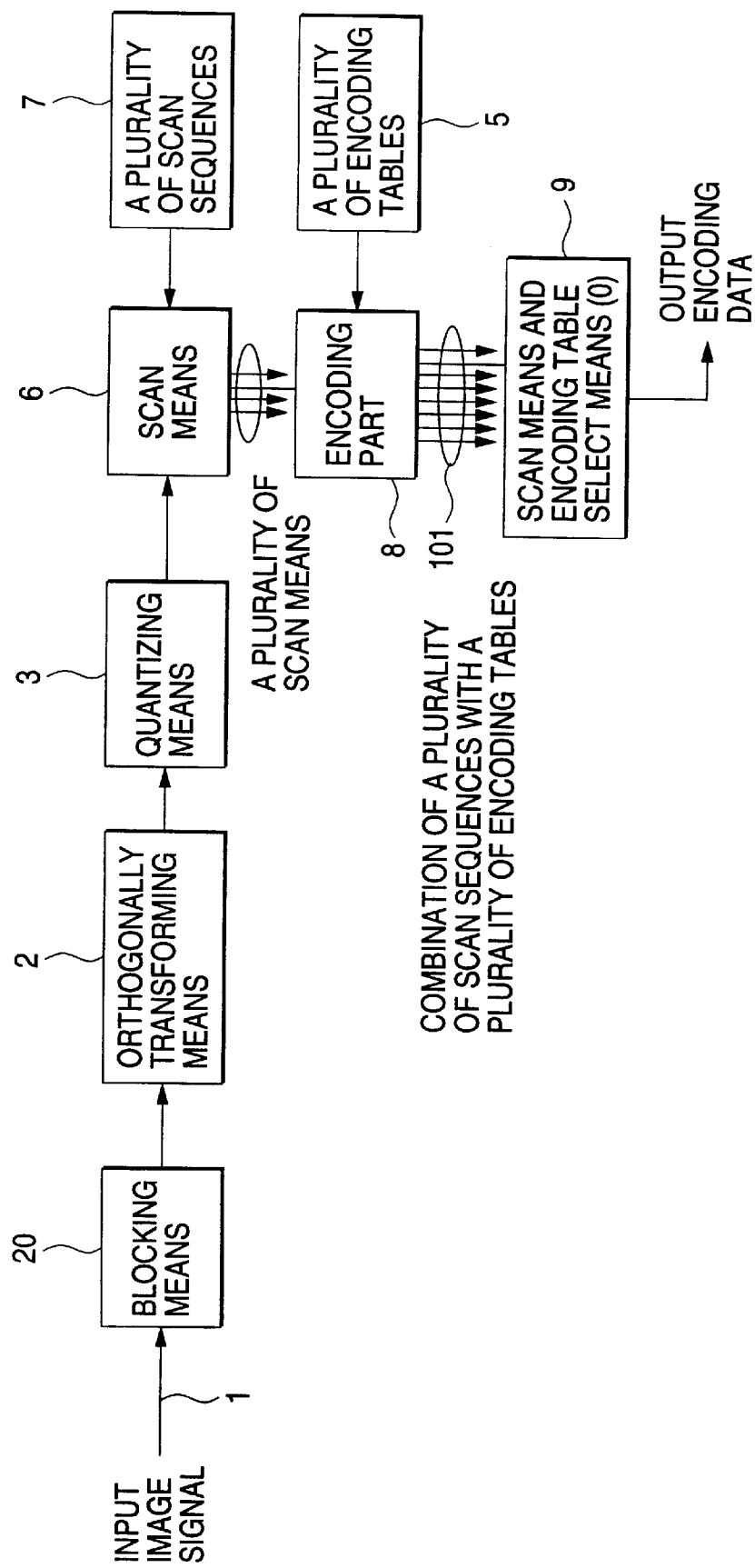
FIG. 1 is a block diagram of the structure of an image encoding system according to an embodiment 1 of the invention.

FIG. 1 is a block diagram of the structure of an embodiment of an image encoding system according to the invention, in which reference character 1 designates an input image signal, 20 blocking means for blocking the input image signal, 2 orthogonally transforming means, 3 quantizing means for quantizing the coefficients of the outputs of the orthogonally transforming means 2, 6 scan means for re-arranging the quantized transformed coefficients output from the quantizing means 3 into a plurality of scan sequences, 7 a scan sequence storage table storing therein a plurality of scan sequences to be used by the scan means 6, 8 encoding means for encoding the quantized transformed coefficients re-arranged or scanned by the scan means 6 using two or more kinds of encoding tables, 5 encoding table storage means storing therein a plurality of encoded tables to be used by the encoding means 8, and 9 scan sequence and encoding table select means (0) for selecting an encoded data output, a scan sequence and an encoding table adaptively out of a plurality of scan sequences and a plurality of encoding tables, respectively. In FIG. 17, there is shown an example of a variable-length encoding technique which is generally used in the encoding means.

Figure 2:
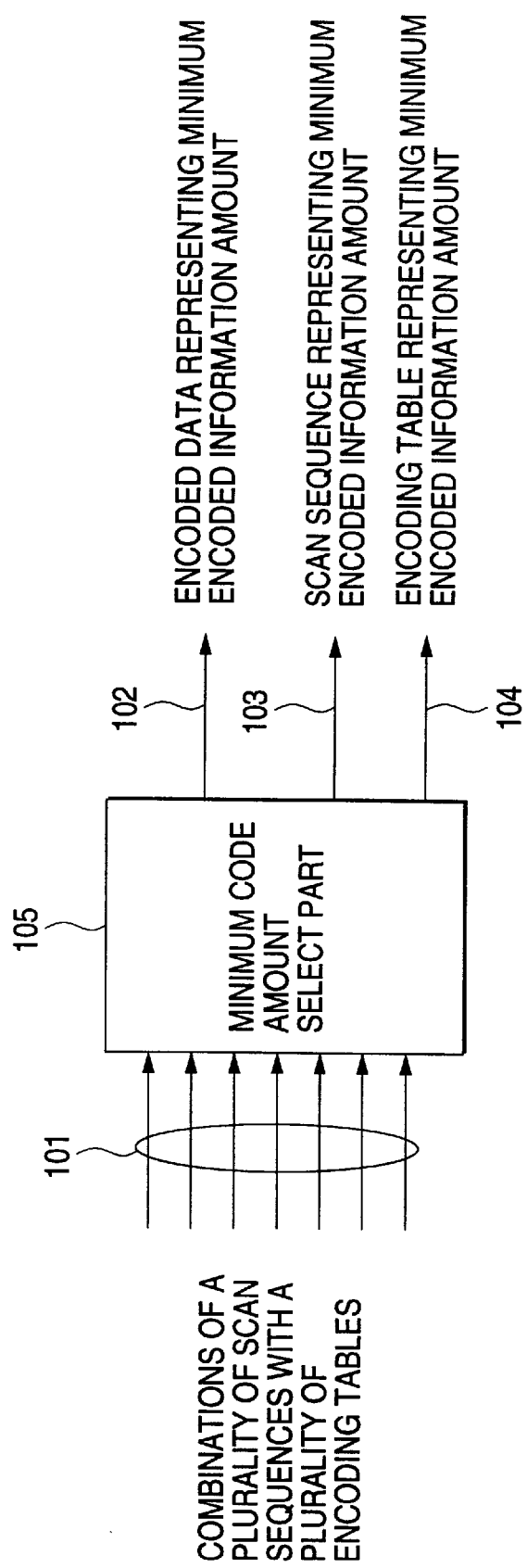
FIG. 2 is a block diagram of an example of the structure of a scan sequence and encoding table select part employed in the embodiment 1 of the invention.

FIG. 2 shows an example of the scan sequence and encoding table select means (0) 9. The present scan sequence and encoding table select means (0) 9 employs, as its inputs, encoded outputs 101 respectively corresponding to the encoded results obtained when the quantized transformed coefficients are encoded according to the combinations of a plurality of scan sequences with a plurality of encoding tables. The select means (0) 9 further includes a minimum encoded information amount select part 105 which is used to output encoded data 102, a scan sequence 103, and an encoding table 104 respectively representing the minimum encoded information amount.

Now, description will be given below of the operation of the present image encoding system with reference to FIGS. 1 and 2. The operation of the present embodiment is similar to the conventional image encoding system in that an input image signal is transformed orthogonally and is then quantized in the quantizing means 3.

The quantized transformed coefficients obtained by the quantizing means 3 are input into the scan means 6, in which the quantized transformed coefficients are scanned every given units by the scan means 6 according to two or more kinds of scan sequences respectively stored in the scan sequence table 7. For example, an image is divided into blocks each including M pixels×N lines and a plurality of such blocks are gathered as a unit, while each of the blocks is scanned in two kinds of scan sequences. Accordingly, the scan means 6 outputs two kinds of scan outputs every unit.

Next, the two or more kinds of scan outputs from the scan means 6 are input into the encoding means 8. The encoding means 8 encodes the two or more kinds of scan outputs with reference to a plurality of encoding tables stored in the encoding table storage means 5.

For example, using two kinds of encoding tables stored in the encoding table storage means 5, the encoding means 8 performs two kinds of encoding processings on each of the two kinds of scan outputs. As a result of this, a total of four kinds of encoded data outputs 101 are output from the encoding means 8.

Since the encoded data outputs of the encoding means 8 are generated by the number that corresponds to the number of combinations of the above-mentioned plurality of scan sequences with the above-mentioned encoding tables, it is necessary to select a proper combination of a scan sequence with an encoding table adaptively out of them and thus the adaptive selection is made by the scan sequence and encoding table select means (0) 9.

In FIG. 2, there is shown an example of the scan sequence and encoding table select means (0) 9. As described above, the select means (0) 9 carries out calculation operations on all of the encoded outputs 101 respectively corresponding to the encoded results obtained when the quantized transformed coefficients are encoded according to the combinations of the plurality of scan sequences with the plurality of encoding tables to thereby find their respective information or code amounts, and then selects the encoded data 101 that gives the minimum information or code amount. By judging which one of the encoded data 101 is selected, it is also possible to know a combination of a scan sequence with an encoding table when the present encoded data 101 is selected.

And, an encoded data 102 representing the smallest or minimum information amount, information 103 representing the present scan sequence, and information 104 representing the present encoding table are gathered together to thereby provide an encoded data output 106, and the encoded data output 106 is treated as the output of the minimum encoded information amount select part 105.

As mentioned above, if an image is divided into a given number of units, the transformed coefficients are scanned every units according to a plurality of scan sequences, and the transformed coefficients, which have been scanned or re-arranged arranged in the plurality of scan sequences, are respectively encoded using a plurality of encoding tables, then even images differing locally in characteristics can be encoded ideally by the above-mentioned units. Especially when the scanned transformed coefficients are encoded together with a plurality of coefficient values or encoding end signals in the form of variable-length codes, it is possible to execute an encoding processing in such a manner that the incidence probabilities of the codes thereof are optimized, which in turn makes it possible to carry out a highly efficient encoding processing.

Here, in the calculation operation of the information amounts, the minimum encoded information amount select part 105 may also operate or calculate the information amounts that include the information representing the scan sequence and the information representing the encoding table.

And, as a given unit to be used in the scan means 6, and as a unit to be used in the encoding means 8 for switching the encoding tables, when an image is divided into blocks each including one of combinations of M pixels×N lines, it is possible to employ a unit which consists of a plurality of such blocks. However, this is not limitative, but the scan sequences and encoding tables can also be switched using a block or an image as a switching unit. In this case as well, the image quality improving effect due to such switching can be expected similarly.

Also, in the above-mentioned embodiment, there are shown the combinations of the two scan sequences and two encoding tables but, of course, the invention is not limited to this.

Here, it should be noted that, by performing a calculation processing on all of the encoded results of the transformed coefficients according to combinations of a plurality of scan sequences with a plurality of encoding tables to thereby find their respective information or code amounts, and also by selecting a combination of a scan sequence with an encoding table which gives the minimum code amounts, it is possible to provide the highest encoding efficiency regardless of the kinds and characteristics of input image signals.

In the above-mentioned embodiment, the scan sequences to be used in the scan means 6 are stored in the scan sequence table 7 and the quantized transformed coefficients are scanned by the scan means 6 in accordance with the scan sequences selected out of the thus stored scan sequences. However, this is not limitative but the scan sequences may be held in the scan means 6 and the transformed coefficients may be scanned according to the plurality of scan sequences in such a manner that the scan sequences may be specified in order.

Embodiment 2

Figure 3:
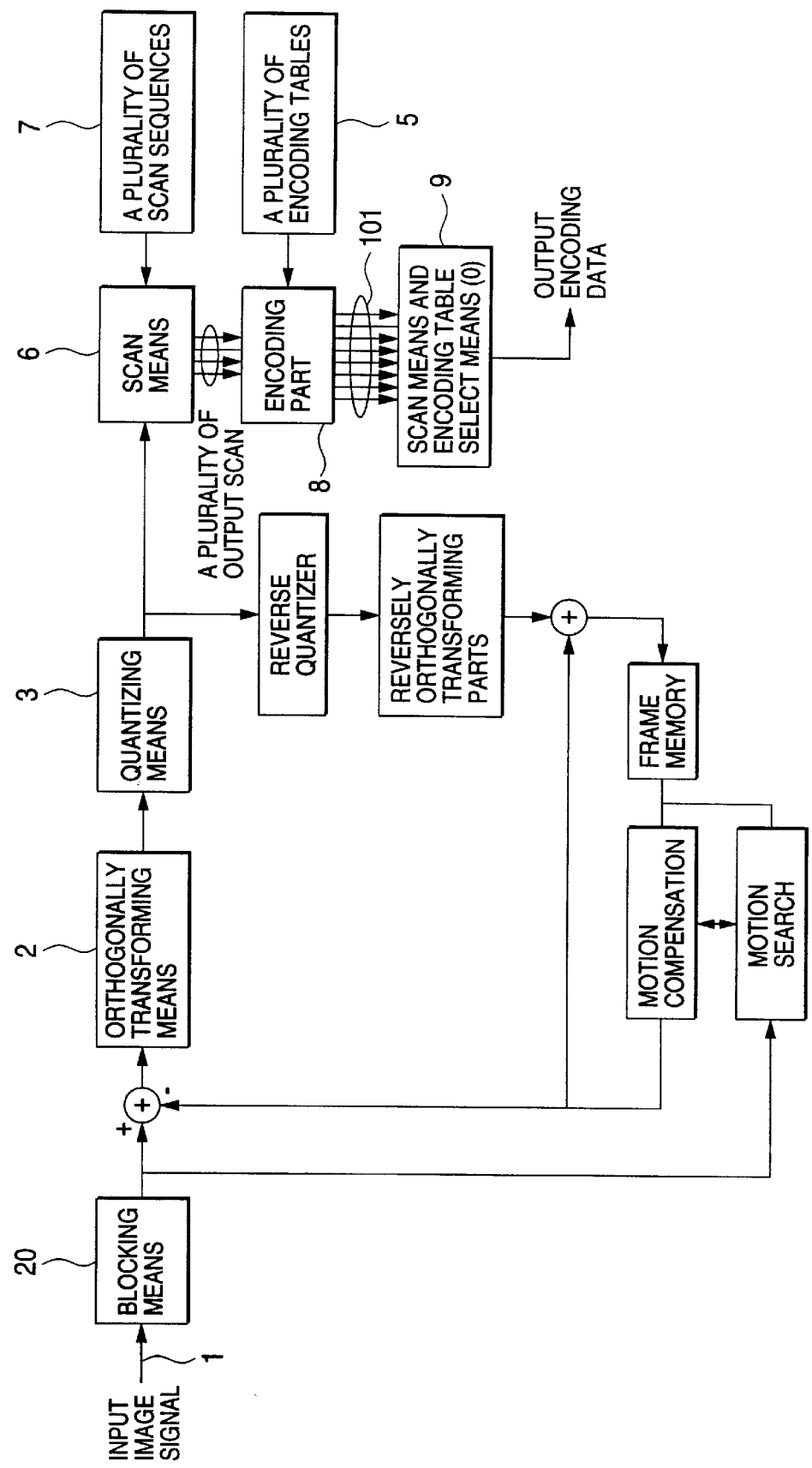
FIG. 3 is a block diagram of the structure of an image encoding system according to an embodiment 2 of the invention.

In the above-mentioned embodiment 1, there is illustrated an image encoding system which performs a within-frame encoding processing, but the present invention can also apply to an image encoding system which executes an inter-frame encoding processing using a motion compensation prediction method in which block means 20 outputs a difference between an already encoded image and a predictive block obtained by compensating the motion of the encoded image. The structure of this embodiment, that is, an embodiment 2 is shown in FIG. 3. The embodiment 2 shows that the present invention can apply not only to the within-frame encoding processing but also to the inter-frame encoding processing using the motion compensation prediction method.

Embodiment 3

Next, description will be given below of an embodiment 3 of an image encoding system according to the invention. The embodiment 3 relates to the embodiment 1 shown in FIG. 1 and the embodiment 2 shown in FIG. 3, but is different from them in that it employs a different kind of select means for selecting a scan sequence and an encoding table.

Figure 4:
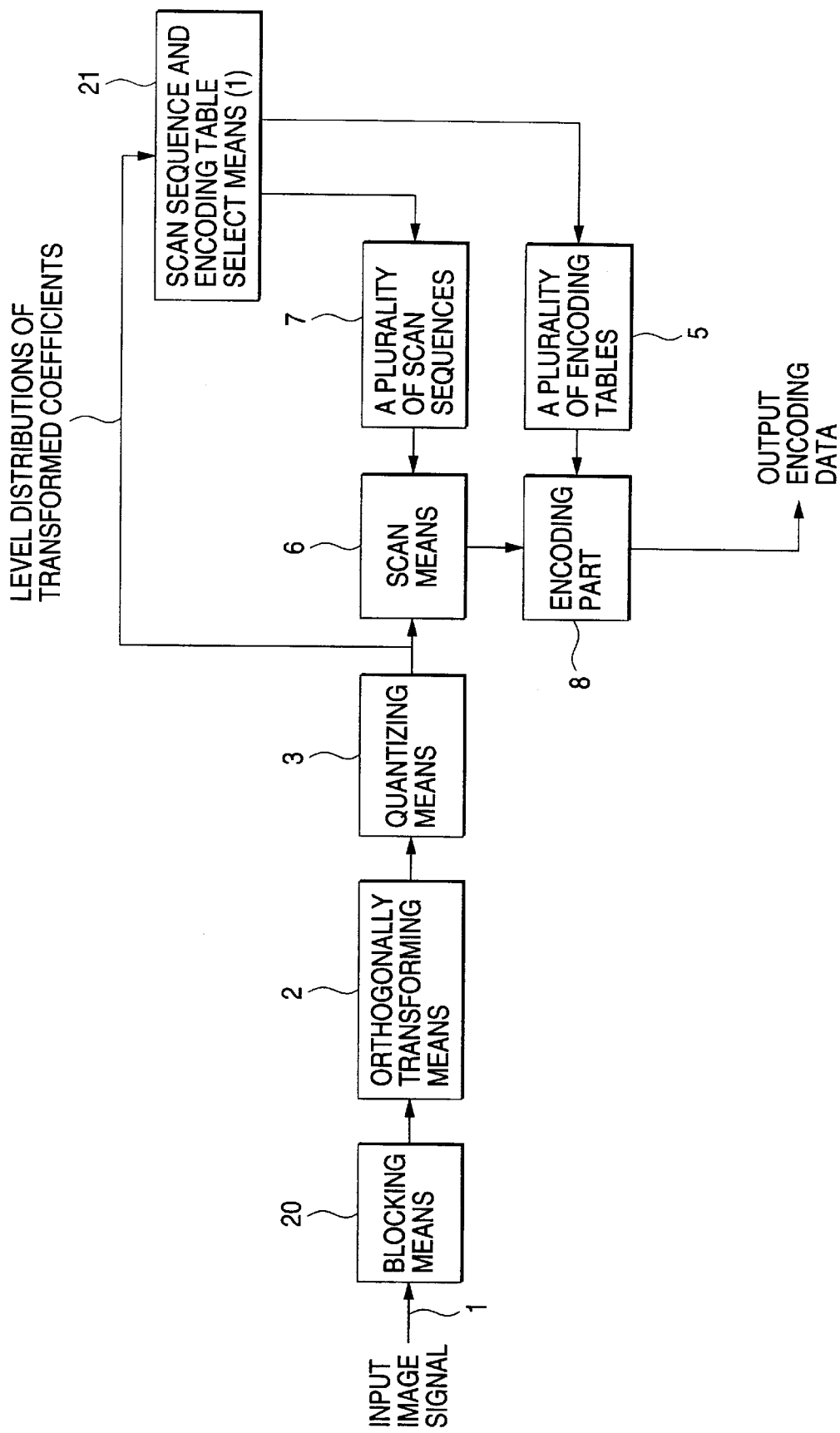
FIG. 4 is a block diagram of the structure of an image encoding system according to an embodiment 3 of the invention.

In FIG. 4, there is shown an embodiment in which the select means for selecting a scan sequence and an encoding table according to the embodiment 3 is applied to the embodiment 1. In FIG. 4, reference character 21 designates scan sequence and encoding table select means (1) which outputs a scan sequence specify signal and an encoding table specify signal in accordance with the level distributions of the transformed coefficients output from the quantizing means 3.

In accordance with the level distributions of the transformed coefficients, the scan sequence and encoding table select means (1) 21 transmits specify signals to a plurality of scan sequences 7 and a plurality of encoding tables 8 respectively and selects one of the scan sequences and enabling tables each. After then, the quantized transformed coefficients are encoded according to the thus selected scan sequence and encoding table.

As described above, by selecting the scan sequence and encoding table adaptively in accordance with the level distributions of the coefficients after they are orthogonally transformed, an encoding efficiency can be improved according to the characteristics of the input signals.

And, the embodiment 3 can also be applied to such inter-frame encoding processing using a motion compensation prediction method as shown in the embodiment 2.

Embodiment 4

Next, description will be given below of an embodiment 4 of an image encoding system according to the invention. This embodiment relates to the embodiment 1 shown in FIG. 1 and the embodiment 2 shown in FIG. 3, but is different from them in that it employs a different kind of select means for selecting a scan sequence and an encoding table.

Figure 5:
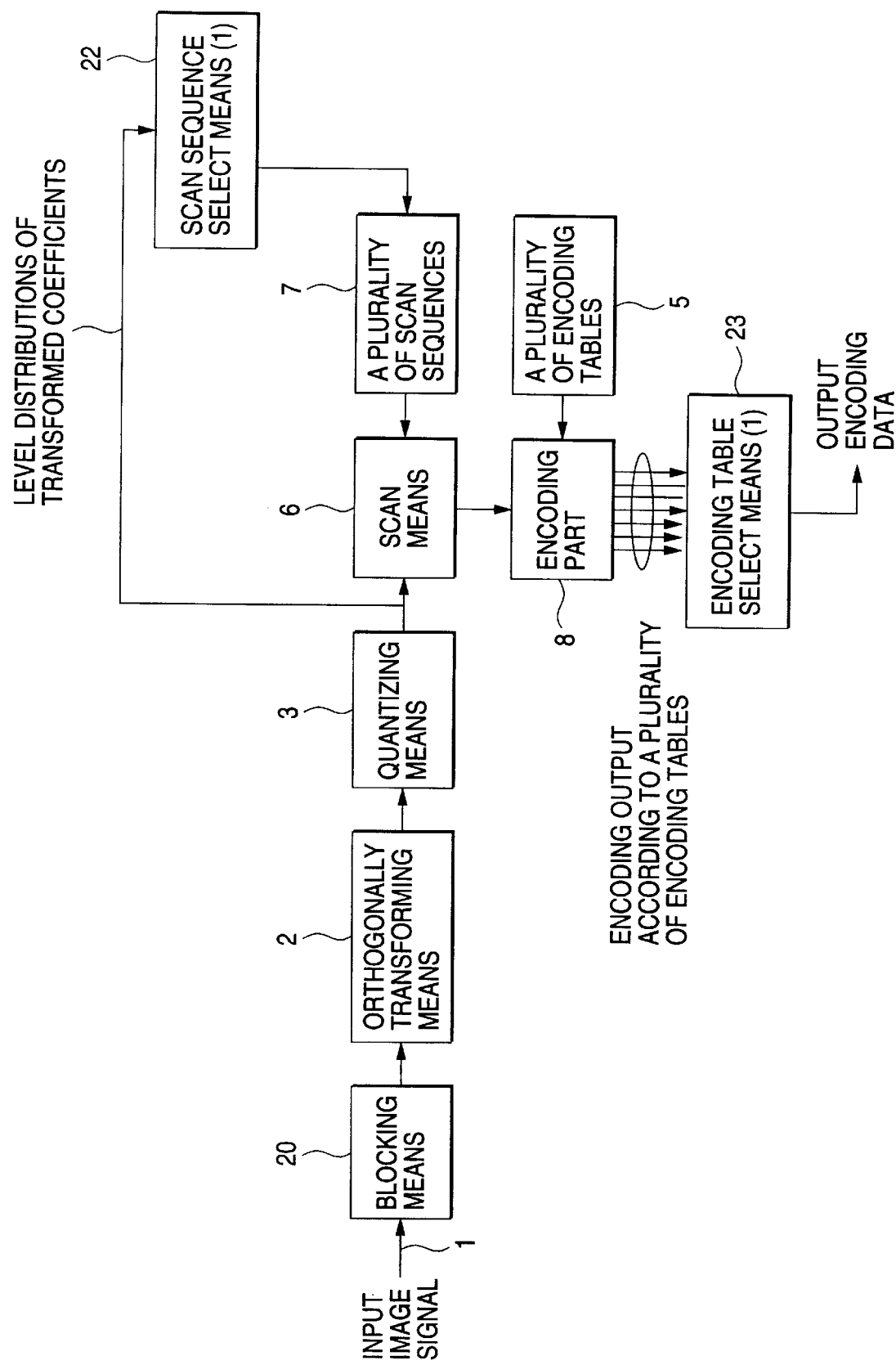
FIG. 5 is a block diagram of the structure of an image encoding system according to an embodiment 4 of the invention.

In FIG. 5, there is shown an embodiment in which select means for selecting a scan sequence and an encoding table according to the present embodiment 4 is applied to the embodiment 1. In FIG. 5, 22 designates scan sequence select means (1) which outputs a scan sequence signal in accordance with the level distributions of the transformed coefficients. And, 23 stands for encoding table select means (1) which selects, out of two or more pieces of encoded data, an encoding table and encoded data which respectively show the minimum information amount.

In operation, in accordance with the level distributions of the transformed coefficients, the scan sequence select means (1) 22 transmits specify signals to a plurality of scan sequences 7 respectively and then selects one scan sequence out of them. The quantized transformed coefficients are scanned according to the thus selected scan sequence, the thus scanned transformed coefficients are encoded according to a plurality of encoding tables 5, and a plurality of encoded outputs are then output from the encoding part 8. The encoding table select means (1) 23 performs a calculation operation on all of the plurality of encoded outputs to find their respective information amounts, and outputs therefrom an encoding table and encoded data which respectively show the minimum information amount. The encoding table that shows the minimum information or code amount is gathered together with the encoded data output.

As described above, according to the embodiment 4, the scan sequence is selected adaptively in accordance with the level distributions of the coefficients after they are transformed orthogonally, the transformed coefficients are scanned according to the selected scan sequence, the scanned transformed coefficients are then encoded using a plurality of encoding tables and the encoded outputs are output, the encoded outputs are all calculation processed to thereby provide their respective code amounts, and the encoding table that shows the minimum code amount is selected. Thanks to this, when compared with the embodiment 3, the encoding part 8 can be structured with less pieces of hardware, which makes it possible to improve an encoding efficiency according to the characteristics of the input signals.

Also, the present embodiment 4 can also be applied to such inter-frame encoding processing using a motion compensation method as shown in the embodiment 2.

Embodiment 5

Figure 6:
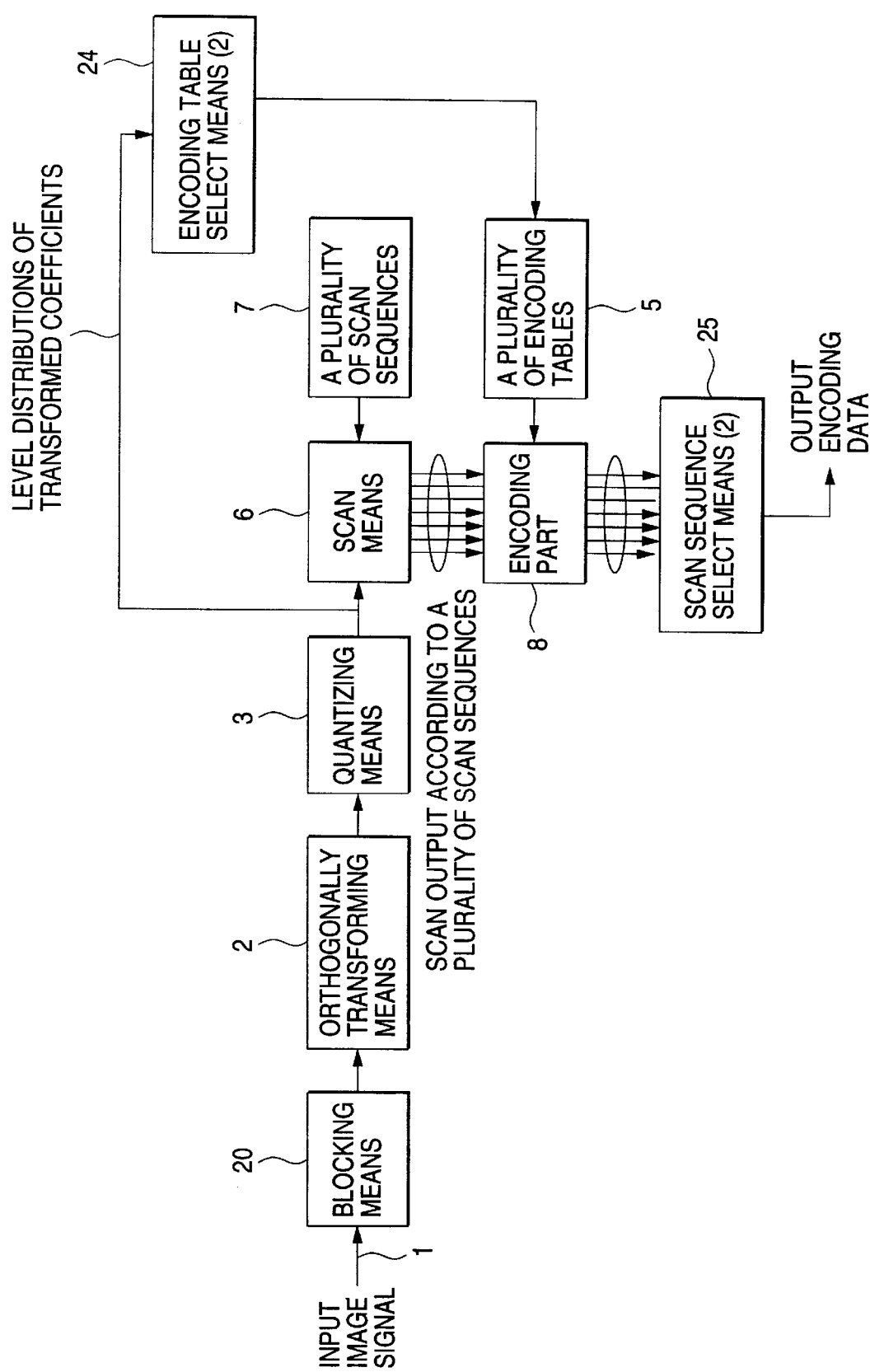
FIG. 6 is a block diagram of the structure of an image encoding system according to an embodiment 5 of the invention.

Next, description will be given below of another embodiment 5 of an image encoding system according to the invention. The embodiment 5 relates to the embodiment 1 shown in FIG. 1 and the embodiment 2 shown in FIG. 3, but is different from them in that it employs a different type of select means for selecting a scan sequence and an encoding table. In FIG. 6, there is shown an example in which select means for selecting a scan sequence and an encoding table according to the present embodiment 5 is applied to the embodiment 1. In FIG. 6, 24 designates encoding table select means (2) which outputs an encoding table select signal in accordance with the level distributions of the transformed coefficients, while 25 stands for scan sequence select means (2) which, out of two or more pieces of encoded data, selects the scan sequence and the encoded data that show the minimum information amount.

In operation, in accordance with the level distributions of the transformed coefficients, the encoding table select means (2) 24 transmits specify signals to a plurality of encoding tables 5 and selects one of them. On the other hand, the quantized transformed coefficients are scanned by the scan means 6 according to a plurality of scan sequences 7 to thereby provide a plurality of scan sequences. The encoding part 8 encodes the plurality of scanned transformed coefficients using the selected encoding table. The scan sequence select means (2) 25 calculation processes all of the plurality of encoded outputs to thereby provide their respective information amounts, and outputs the scan sequence and encoded data that show the minimum information or code amount.

As described above, according to the embodiment 5, an encoding table is selected in accordance with the level distributions of the coefficients after they are transformed orthogonally, the quantized transformed coefficients are scanned according to two or more kinds of scan sequences and are then encoded using the selected encoding table, the plurality of encoded outputs are all calculation processed to thereby provide their respective code amounts, and the scan sequence that shows the minimum code amount is selected. Due to this, when compared with the embodiment 3, it is possible to improve an encoding efficiency according to the characteristics of the input signals with less pieces of hardware.

And, the present embodiment 5 can also be applied to such inter-frame encoding processing using a motion compensation prediction method as shown in the embodiment 2.

Embodiment 6

Figure 7:
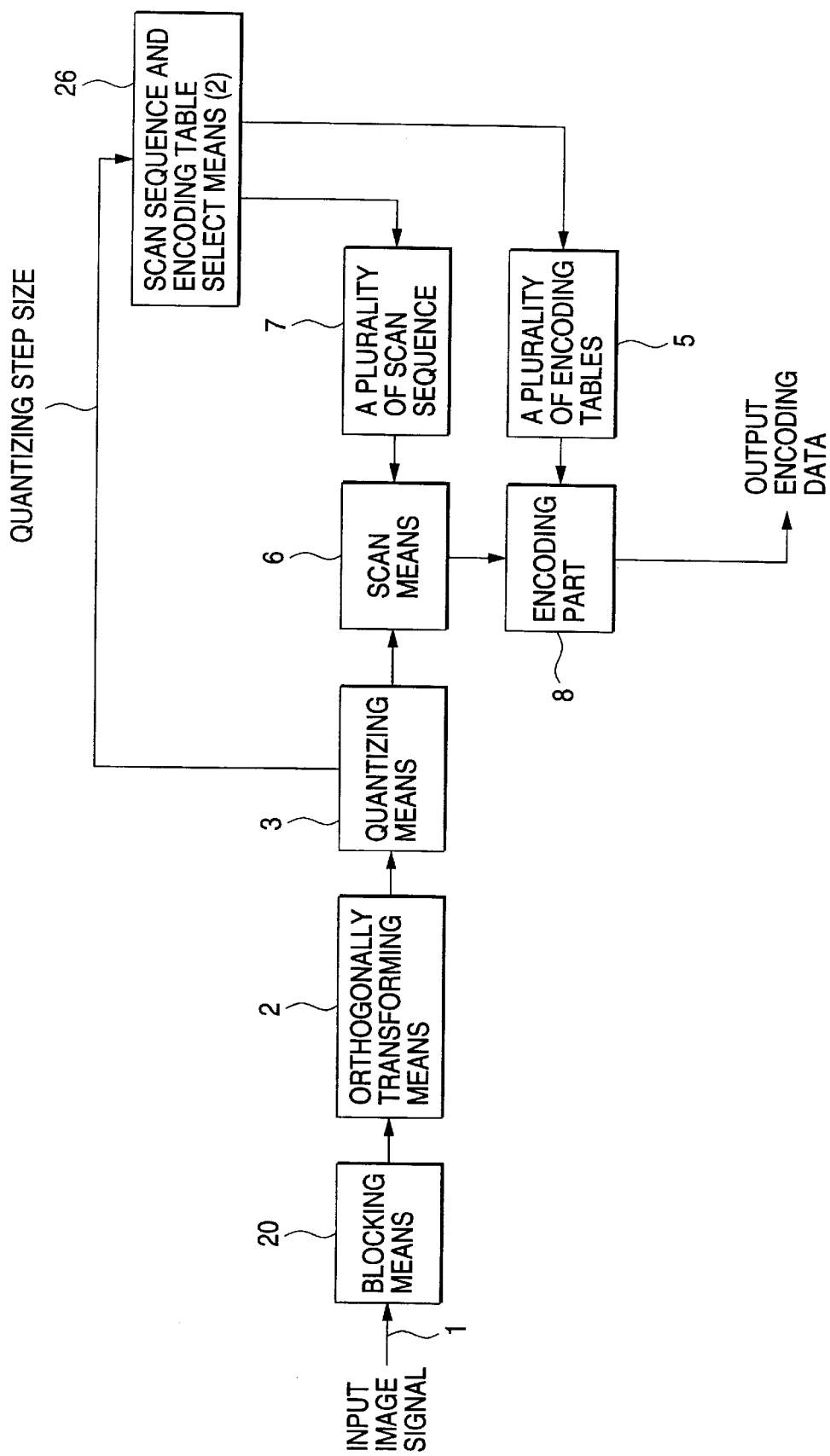
FIG. 7 is a block diagram of the structure of an image encoding system according to an embodiment 6 of the invention.

Next, description will be given below of an embodiment 6 of an image encoding system according to the invention. This embodiment 6 relates to the embodiment 1 shown in FIG. 1 and the embodiment 2 shown in FIG. 3, but is different from them in that it uses a different type of select means for selecting a scan sequence and an encoding table. In FIG. 7, there is shown an example in which the select means for selecting a scan sequence and an encoding table according to the present embodiment 6 is applied to the embodiment 1. In FIG. 7, 26 designates scan sequence and encoding table select means (2) which, in accordance with a quantizing step size to be used in the quantizing means, outputs a scan sequence specify signal and an encoding table specify signal.

In operation, in accordance with the quantizing step size used to be in the quantizing means, the scan sequence and encoding table select means (2) outputs specify signals to a plurality of s can sequences 7 and a plurality of encoding tables 5 respectively and selects one of the scan sequences and encoding tables each. The transformed coefficients that have been quantized are then encoded by the thus selected scan sequence and encoding table.

As described above, by selecting the scan sequence and encoding table adaptively in accordance with the quantizing step size to be used in the quantizing means, it is possible to improve an encoding efficiency with respect to a given quantizing step size.

And, the present embodiment 6 can also be applied to such inter-frame encoding processing using a motion compensation method as shown in the embodiment 2.

Embodiment 7

Figure 8:
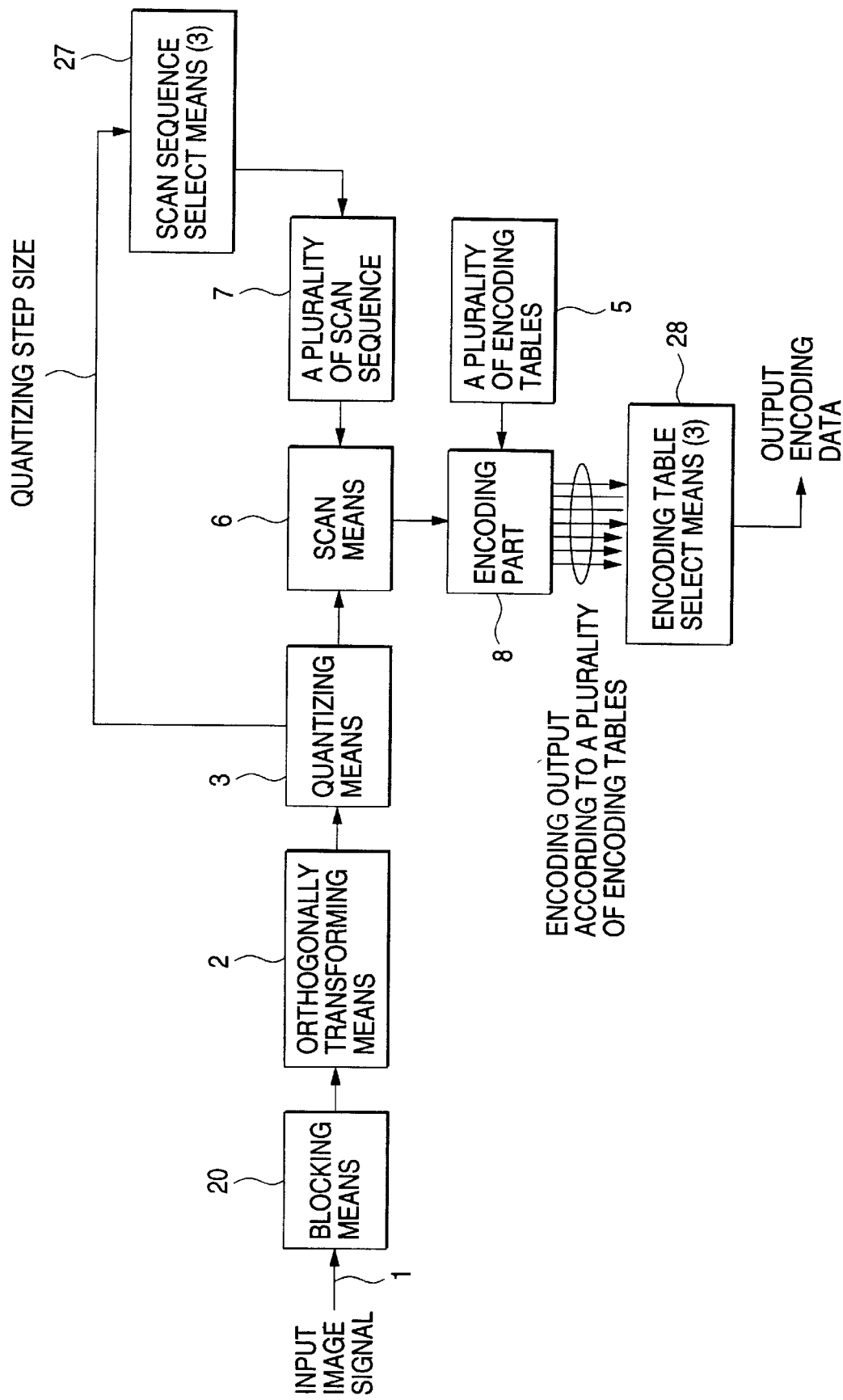
FIG. 8 is a block diagram of the structure of an image encoding system according to an embodiment 7 of the invention.

Next, description will be given below of an embodiment 7 of an image encoding system according to the invention. This embodiment 7 relates to the embodiment 1 shown in FIG. 1 and the embodiment 2 shown in FIG. 3, but is different from them in that it uses a different type of select means for selecting a scan sequence and an encoding table. In FIG. 8, there is shown an example in which the select means for selecting a scan sequence and an encoding table according to the present embodiment 7 is applied to the embodiment 1. In FIG. 8, 27 designates scan sequence select means (3) which, in accordance with a quantizing step size to be used when the transformed coefficients are quantized, outputs a scan sequence specify signal. And, 28 stands for encoding table select means (3) which selects the encoding table and encoded data that show the minimum information amount out of two or more pieces of encoded data.

In operation, in accordance with the quantizing step size, the scan sequence select means (3) transmits specify signals to a plurality of scan sequences 7 respectively, and selects one of the scan sequences. The quantized transformed coefficients are scanned according to the selected scan sequence, the thus scanned transformed coefficients are then encoded according to a plurality of encoding tables 5 to thereby provide a plurality of encoded transformed coefficients, and the plurality of encoded transformed coefficients are output from the encoding part 8 as a plurality of encoded outputs. Then, the encoding table select means (3) 28 performs a calculation processing on all of the plurality of encoded outputs to thereby obtain their respective information amounts, and then selects and outputs the encoding table and encoded data that show the minimum information amount.

That is, according to the embodiment 7, as described above, a scan sequence is selected adaptively in accordance with the quantizing step size to be used in the quantizing means, the quantized transformed coefficients are encoded using the thus selected scan sequence and also using a plurality of encoding tables, all of the encoded data are then calculation processed to thereby obtain a plurality of information or code amounts, and the encoding table that shows the minimum code amount is selected. Thanks to this, it is possible to improve an encoding efficiency with respect to a given quantizing step size with less pieces of hardware when compared with the embodiment 4.

Here, the present embodiment 7 can also applied to such inter-frame encoding processing using a motion compensation prediction method as shown in the embodiment 2.

Embodiment 8

Next, description will be given below of an embodiment 8 of an image encoding system according to the invention.

Figure 9:
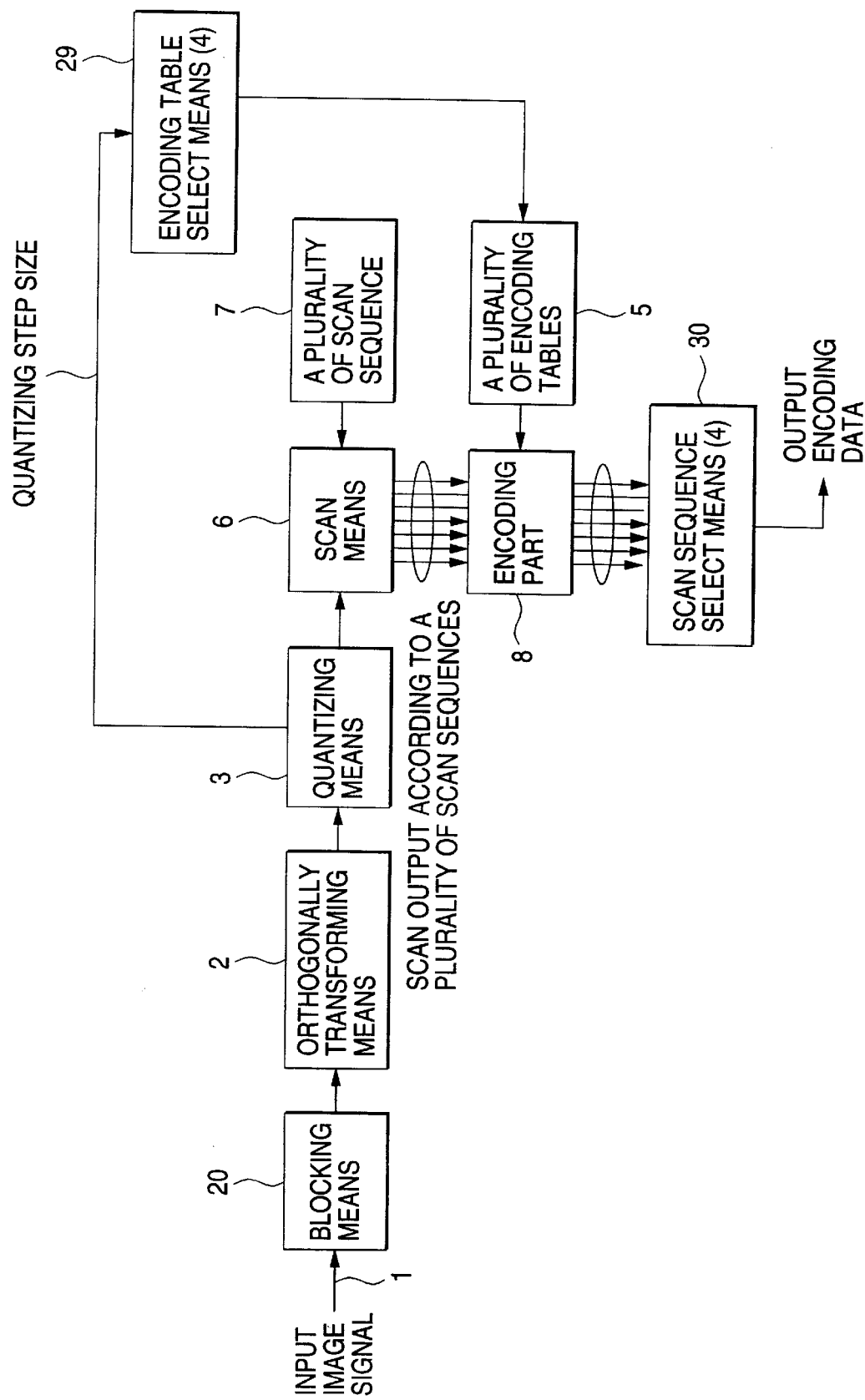
FIG. 9 is a block diagram of the structure of an image encoding system according to an embodiment 8 of the invention.

This embodiment 8 relates to the embodiment 1 shown in FIG. 1 and the embodiment 2 shown in FIG. 3, but is different from them in that it uses a different type of select means for selecting a scan sequence and an encoding table. In FIG. 9, there is shown an example in which the select means for selecting a scan sequence and an encoding table according to the present embodiment 8 is applied to the embodiment 1. In FIG. 9, 29 designates encoding table select means (4) which outputs an encoding table specify signal in accordance with a quantizing step size to be used when the transformed coefficients are quantized. And, 30 stands for scan sequence select means (4) which, out of two or more pieces of encoded data, selects the scan sequence and encoded data that show the minimum information amount.

In this embodiment 8, in accordance with the quantizing step size, the encoding table select means (4) 29 outputs specify signals to a plurality of encoding tables 5 respectively, and selects one of the encoding tables. On the other hand, the quantized transformed coefficients are scanned by the scan means 6 according to a plurality of encoding sequences 7 to thereby provide a plurality of scan sequences. The encoding means 8 encodes the plurality of scanned transformed coefficients using the selected encoding table. The scan sequence select means (4) 30 performs a calculation operation on all of the plurality of encoded outputs to thereby obtain their respective information amounts, and then selects and outputs the scan sequence and encoded data that show the minimum information or code amount.

That is, according to the embodiment 8, an encoding table is selected in accordance with the quantizing step size that is used in the quantizing means, the quantized transformed coefficients are encoded according to a plurality of scan sequences as well as the selected encoding table to provide a plurality of encoded outputs, all of the plurality of encoded outputs are then calculation processed to thereby obtain their respective information or code amounts, and the scan sequence that shows the minimum code amount is selected. This can improve an encoding efficiency with respect to a given quantizing step size with less pieces of hardware when compared with the embodiment 4.

And, the present embodiment 8 can also be applied to such inter-frame encoding processing using a motion compensation prediction method as shown in the embodiment 2.

Embodiment 9

Figure 10:
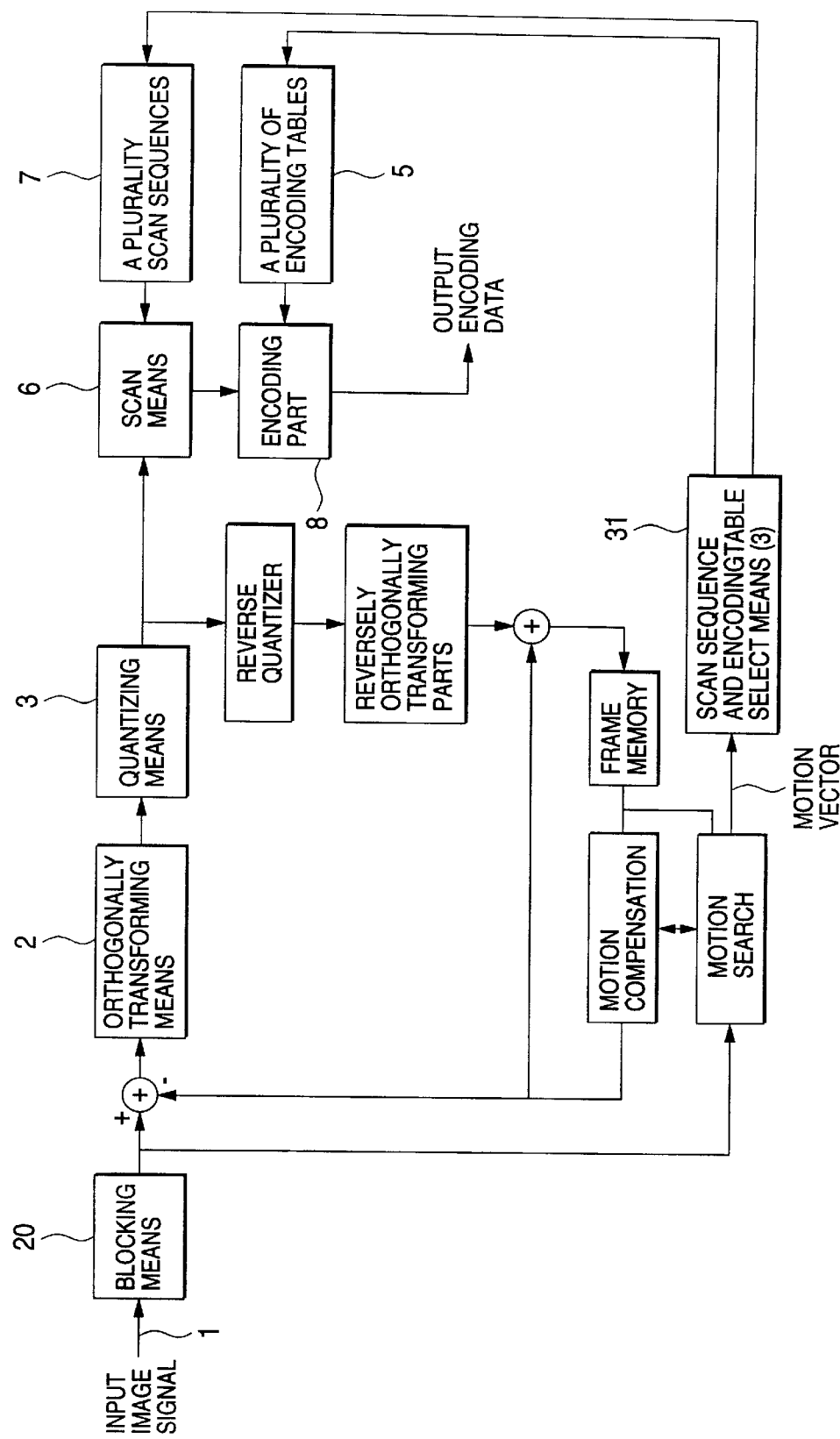
FIG. 10 is a block diagram of the structure of an image encoding system according to an embodiment 9 of the invention.

Next description will be given below of an embodiment 9 of an image encoding system according to the invention. The present embodiment 9 relates to the embodiment 2 shown in FIG. 3, but is different from the embodiment 2 in that it uses another select means for selecting a scan sequence and an encoding table. In FIG. 10, there is shown an example in which the select means for selecting a scan sequence and an encoding table according to the present embodiment 9 is applied to the embodiment 2. In FIG. 10, 31 designates scan sequence and encoding table select means (3) which, in accordance with the motion vector which is output when the motion of an encoded image is searched for compensation thereof, outputs a scan sequence specify signal and an encoding table specify signal.

In operation, based on the motion vector that is the output as the result of the search for the motion of the encoded image, the scan sequence and encoding table (3) 31 outputs specify signals to a plurality of scan sequences 7 and a plurality of encoding tables 5, and selects one of the scan sequences and encoding tables each. The quantized transformed coefficients are encoded according to the thus selected scan sequence and encoding table.

As described above, according to the embodiment 9, since a scan sequence and an encoding table are selected adaptively based on the motion vector consisting of the motion search output to be used for compensation of the motion of the encoded image, it is possible to improve an encoding efficiency with respect to the motion of the encoded image.

Embodiment 10

Figure 11:
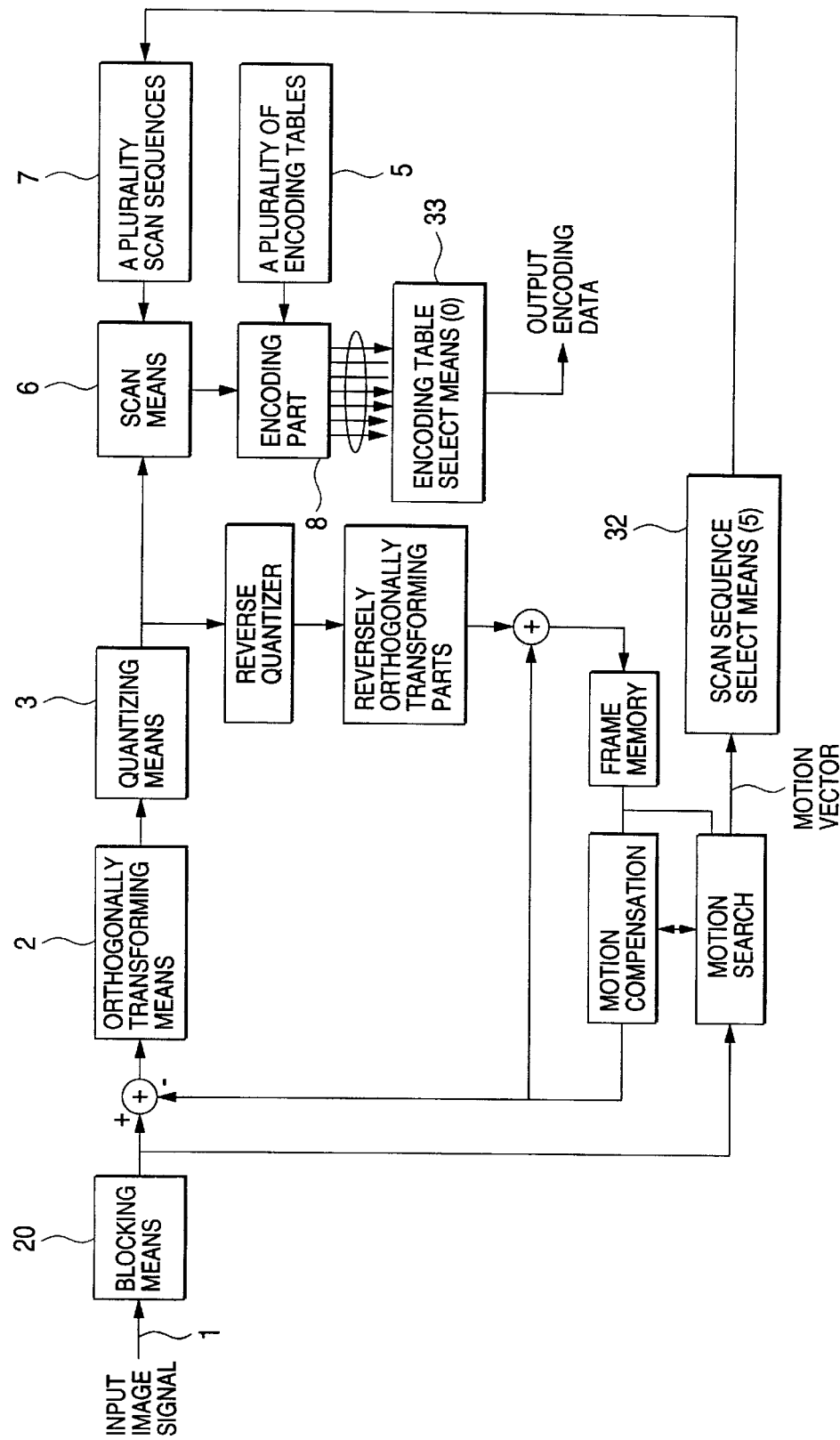
FIG. 11 is a block diagram of the structure of an image encoding system according to an embodiment 10 of the invention.

Next, description will be given below of an embodiment 10 of an image encoding system according to the invention. The present embodiment 10 relates to the embodiment 2 shown in FIG. 3, but is different from the embodiment 2 in that it uses another select means for selecting a scan sequence and an encoding table. In FIG. 11, there is shown an example in which the select means for selecting a scan sequence and an encoding table according to the present embodiment 10 is applied to the embodiment 2. In FIG. 11, 32 designates scan sequence select means (5) which, in accordance with the motion vector which is output when the motion of the encoded image is searched for compensation thereof, outputs a scan sequence specify signal. And, 33 stands for encoding table select means (5) which, out of two or more pieces of encoded data, selects the encoding table and encoded data that show the minimum information amount.

In operation, in accordance with the motion vector that is output when is output when the motion of the encoded image is searched for compensation thereof, the scan sequence select means (5) 32 transmits specify signals to a plurality of scan sequences 7 respectively, and then selects one of the scan sequences. The quantized transformed coefficients are scanned according to the selected scan sequence, the scanned transformed coefficients are encoded according to a plurality of encoding tables 5, and the encoded transformed coefficients are output from the encoding part 8 as a plurality of encoded outputs. The encoding table select means (5) 33 performs a calculation processing on all of the plurality of encoded outputs to thereby obtain their respective information amounts, and then selects and outputs the encoding table and encoded data that show the minimum information amount.

That is, according to the embodiment 10, as described above, a scan sequence is selected adaptively based on the motion vector that is output when the motion of the encoded image is searched for compensation thereof, the quantized transformed coefficients are encoded according to the selected scan sequence and using a plurality of encoding tables, the encoded outputs are all processed to thereby provide a plurality of information or code amounts, and the encoding table that shows the minimum code amount is selected. Thanks to this, it is possible to improve an encoding efficiency with respect to the motion of the encoded image with less pieces of hardware when compared with the tenth invention.

Embodiment 11

Figure 12:
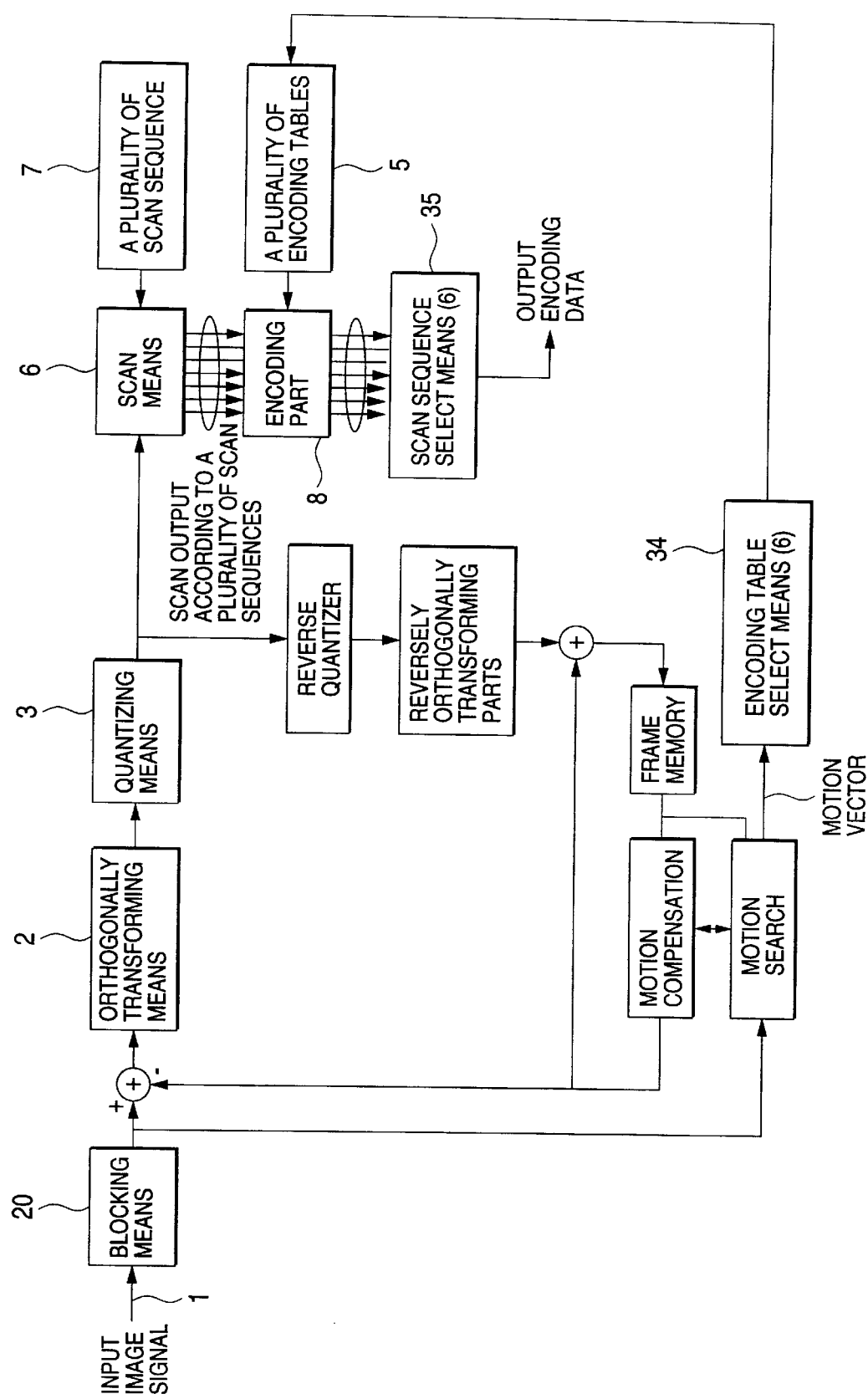
FIG. 12 is a block diagram of the structure of an image encoding system according to an embodiment 11 of the invention.

Next, description will be given below of an embodiment 11 of an image encoding system according to the invention. The present embodiment 11 relates to the embodiment 2 shown in FIG. 3, but is different from the embodiment 2 in that it uses another type of select means for selecting a scan sequence and an encoding table. In FIG. 12, there is shown an example in which the select means for selecting a scan sequence and an encoding table according to the present embodiment 11 is applied to the embodiment 2. In FIG. 12, 34 designates encoding table select means (6) which, in accordance with the motion vector which is output due when the motion of the encoded image is searched for compensation thereof, outputs an encoding table specify signal.

And, 35 stands for scan sequence select means (6) which, out of two or more pieces of encoded data, selects the scan sequence and encoded data that show the minimum information amount.

In operation, in accordance with the motion vector which is output when the motion of the encoded image is searched for compensation thereof, the encoding table select means (6) outputs specify signals to a plurality of encoding tables 5 respectively, and then selects one of the encoding tables. On the other hand, the quantized transformed coefficients are scanned by the scan means 6 according to a plurality of scan sequences 7 to thereby provide a plurality of scan sequences. The encoding part 8 encodes the plurality of scanned transformed coefficients using the selected encoding table. The scan sequence select means (6) 35 performs a calculation operation on all of the plurality of encoded outputs to thereby provide their respective information amounts, and selects and outputs the scan sequence and encoded data that show the minimum information or code amount.

As mentioned above, according to the embodiment 11, an encoding table is selected adaptively in accordance with the motion vector which is output when the motion of the encoded image is searched for compensation thereof, the quantized transformed coefficients are encoded according to a plurality of scan sequences and using the selected encoding table, the plurality of the encoded outputs are all calculation processed to thereby obtain their respective code amounts, and the scan sequence that shows the minimum code amount is then selected. This makes it possible to improve an encoding efficiency with respect to the motion of the encoded image with less pieces of hardware when compared with the tenth invention.

Embodiment 12

Figure 13:
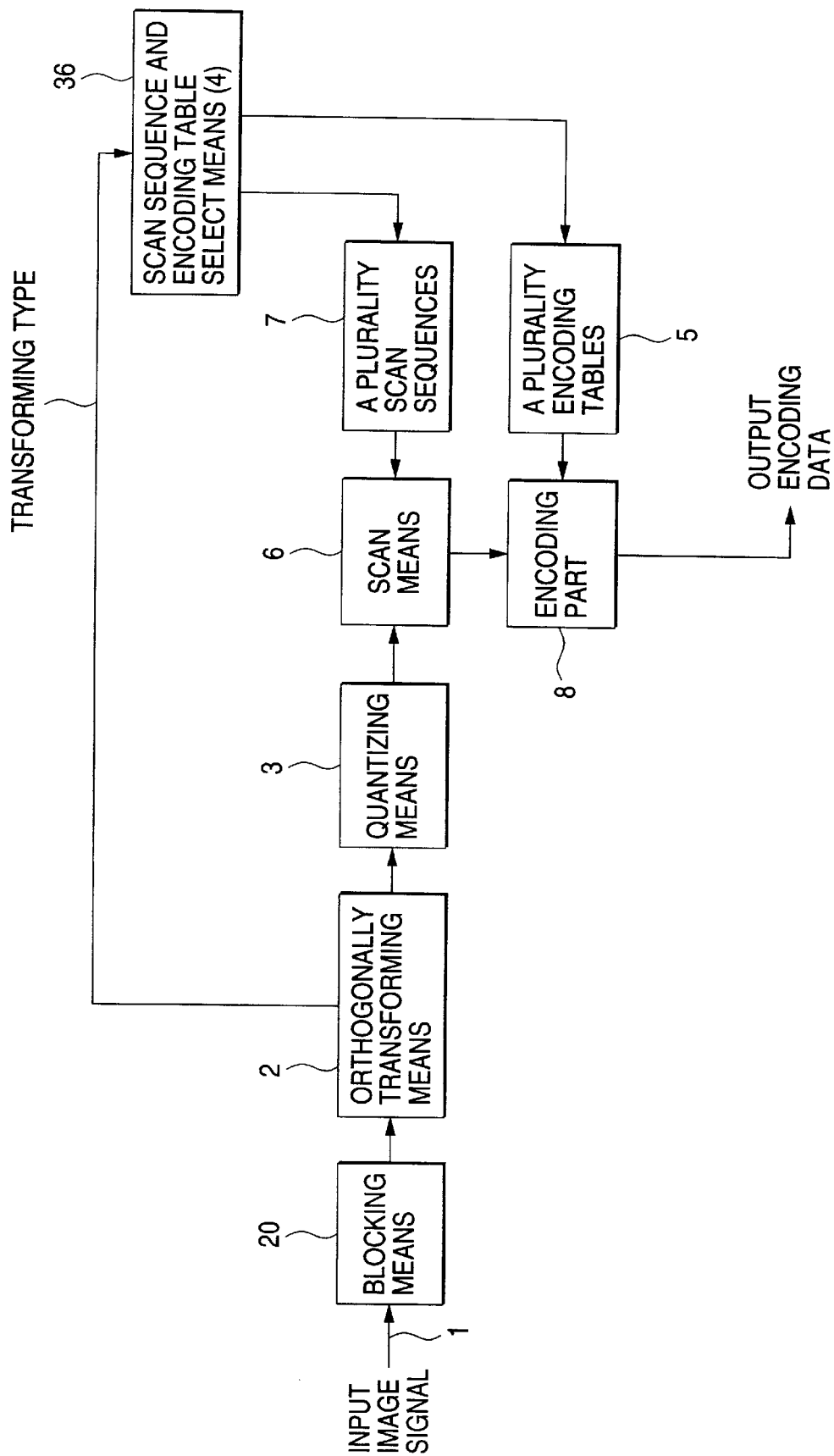
FIG. 13 is a block diagram of the structure of an image encoding system according to an embodiment 12 of the invention.

Next, description will be given below of an embodiment 12 of an image encoding system according to the invention. The present embodiment 12 relates to the embodiment 1 shown in FIG. 1, but is different from the embodiment 1 in that it uses another type of select means for selecting a scan sequence and an encoding table. In FIG. 13, there is shown an example in which the select means for selecting a scan sequence and an encoding table according to the present embodiment 12 is applied to the embodiment 1. In FIG. 13, 36 designates scan sequence and encoding table select means (4) which, in accordance with the transforming types when the coefficients are transformed, outputs a scan sequence specify signal and an encoding table specify signal.

In operation, in accordance with the transforming types when the coefficients are transformed, the scan sequence and encoding table select means (4) 36 outputs specify signals to a plurality of scan sequences 7 and a plurality of encoding tables 5, and then selects one of the scan sequences and encoding tables each. The quantized transformed coefficients are encoded according to the thus selected scan sequence and encoding table.

And, the present embodiment 12 can also be applied to such inter-frame encoding processing using a motion compensation prediction method as shown in the embodiment 2.

As described above, according to the embodiment 12, by selecting a scan sequence and an encoding table adaptively, it is possible to improve an encoding efficiency with respect to the block encoding types.

Embodiment 13

Figure 14:
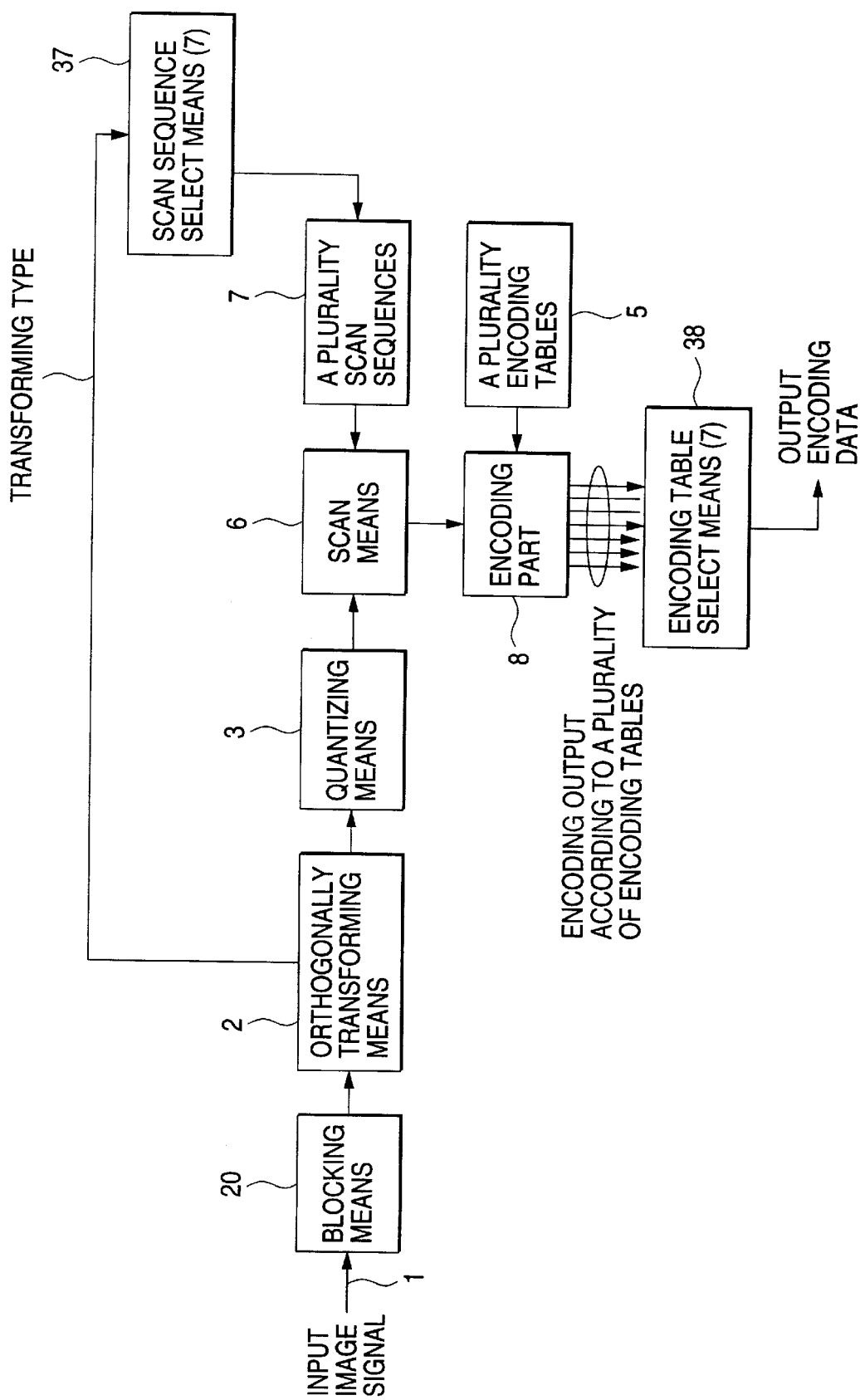
FIG. 14 is a block diagram of the structure of an image encoding system according to an embodiment 13 of the invention.

Next, description will be given below of an embodiment 13 of an image encoding system according to the invention. This embodiment 13 relates to the embodiment 1 shown in FIG. 1 and the embodiment 2 shown in FIG. 3, but is different from them in that the embodiment 13 uses another type of select means for selecting a scan sequence and an encoding table. In FIG. 14, there is shown an example in which a select means for selecting a scan sequence and an encoding table according to the embodiment 13 is applied to the embodiment 1. In FIG. 14, 37 designates scan sequence select means (7) which outputs scan sequence specify signals in accordance with the transforming types. And, 38 stands for encoding table select means (7) which, out of two or more pieces of encoded data, selects the encoding table and encoded data that show the minimum information amount.

In operation, in accordance with the block encoding types in transformation, the scan sequence select means (7) 37 outputs specify signals to a plurality of scan sequences 7 and selects one of the scan sequences. The quantized transformed coefficients are scanned according to the selected scan sequence, while the scanned transformed coefficients are encoded according to a plurality of encoding tables 5 to thereby provide a plurality of encoded outputs and the plurality of encoded outputs are then output from the encoding part 8. Then, the encoding table select means (7) 38 performs a calculation operation on all of the plurality of encoded outputs to thereby obtain their respective information amounts, and outputs the encoding table and encoded data that show the minimum information amount.

As described above, according to the embodiment 13, a scan sequence is selected adaptively in accordance with the block encoding types, the quantized transformed coefficients are scanned according to the selected scan sequence and are then encoded according to a plurality of encoding tables, a plurality of encoded outputs are all processed to thereby provide their respective information or code amounts, and the encoding table that shows the smallest code amount is selected. Thanks to this, the embodiment 13 is able to improve an encoding efficiency with respect to the block encoding types with less pieces of hardware when compared with the embodiment 12.

And, the present embodiment 13 can also be applied to such inter-frame encoding processing using a motion compensation prediction method as shown in the embodiment 2.

Embodiment 14

Figure 15:
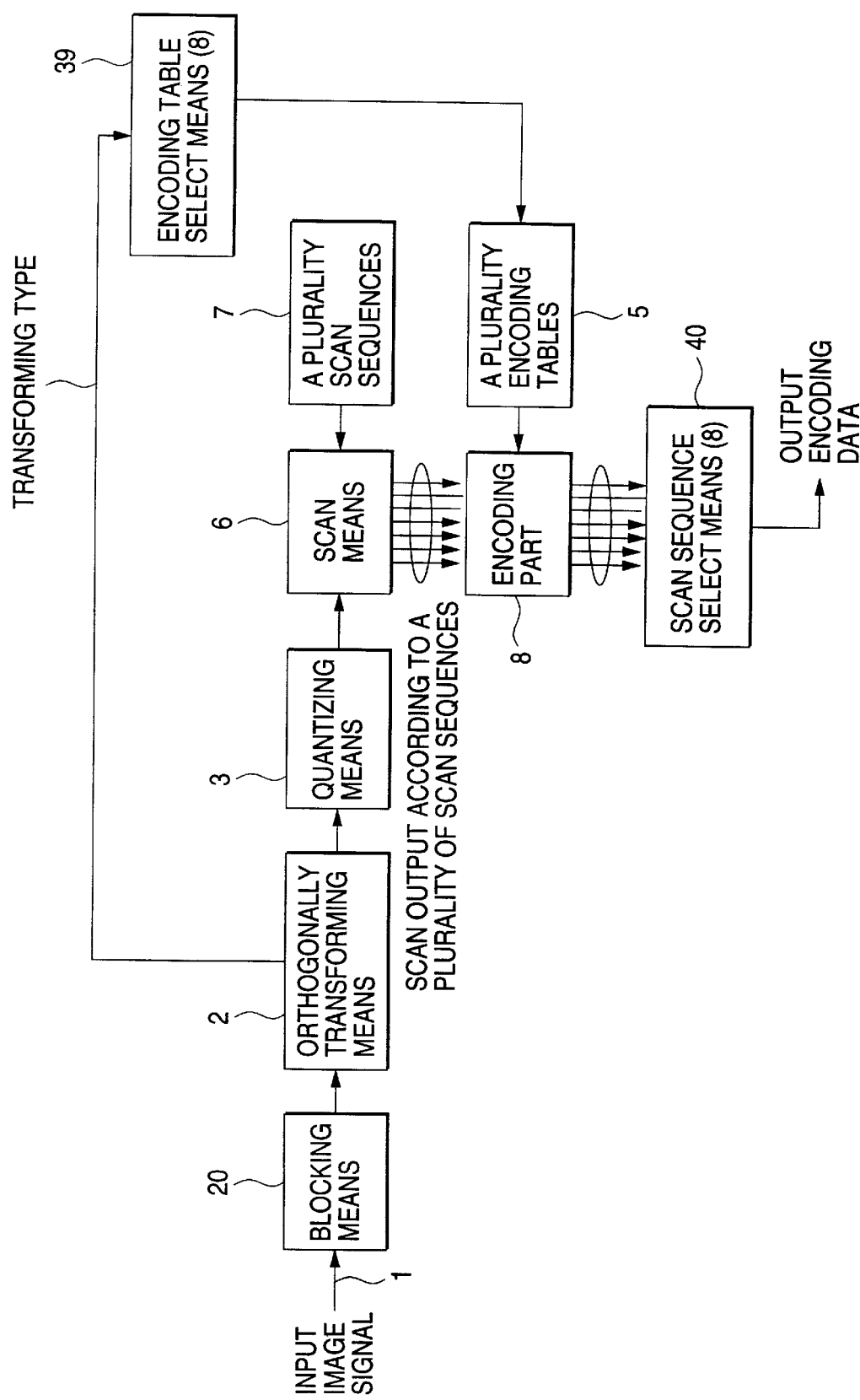
FIG. 15 is a block diagram of an example of a scan sequence employed in an image encoding system according to an embodiment 14 of the invention.

Next, description will be given below of an embodiment 14 of an image encoding system according to the invention. This embodiment 14 relates to the embodiment 1 shown in FIG. 1 and the embodiment 2 shown in FIG. 3, but is different from them in that the embodiment 14 uses another type of select means for selecting a scan sequence and an encoding table. In FIG. 15, there is shown an example in which the select means for selecting a scan sequence and an encoding table according to the embodiment 14 is applied to the embodiment 1. In FIG. 15, 39 designates encoding table select means (8) which outputs encoding table specify signals in accordance with the block transforming types when the coefficients are transformed. And, 40 stands for scan sequence select means (8) which, out of two or more pieces of encoded data, selects the scan sequence and encoded data that show the minimum information amount.

In operation, in accordance with the block transforming types when the coefficients are transformed, the encoding table select means (8) 39 outputs specify signals to a plurality of encoding tables 5 and selects one of the encoding tables. On the other hand, the quantized transformed coefficients are scanned by the scan means 6 according to a plurality of scan sequences to thereby provide a plurality of scan sequences. Then, the encoding part 8 encodes the plurality of scanned transformed coefficients using the selected encoding table to provide a plurality of encoded outputs. After then, the scan sequence select means (8) 40 performs a calculation operation on all of the plurality of encoded outputs to thereby obtain their respective information amounts, and then outputs the scan sequence and encoded data that show the minimum information amount.

As described above, according to the embodiment 14, an encoding table is selected in accordance with the block transforming or encoding types, the transformed coefficients are scanned according to a plurality of scan sequences and the thus scanned transformed coefficients are encoded according to the selected encoding table to thereby provide a plurality of encoded outputs, the plurality of encoded outputs are all processed to thereby obtain their respective information or code amounts, and the scan sequence that shows the minimum code amount is selected. Due to this, the embodiment 14 is able to improve an encoding efficiency with respect to the block encoding types with less pieces of hardware when compared with the thirteenth invention.

Embodiment 15

Next, description will be given below of an embodiment 15 of an image encoding system according to the invention. This embodiment 15 relates to the embodiments 1 through 14 and includes in a plurality of scan sequence 7 a scan sequence in which the transformed coefficients are arranged in the order of the lower frequency components thereof toward the higher frequency components thereof. In FIG. 16, there is shown an example of such scan sequence in which the transformed coefficients are arranged in the order of the lower frequency components thereof toward the higher frequency components thereof.

In this manner, if a plurality of scan sequence for scanning the coefficients after they are transformed orthogonally is structured so as to include a scan sequence in which the transformed coefficients in a block are arranged in the order of the lower frequency components thereof toward the higher frequency components thereof, then the transformed coefficients can be scanned efficiently.

Embodiment 16

Figure 18:
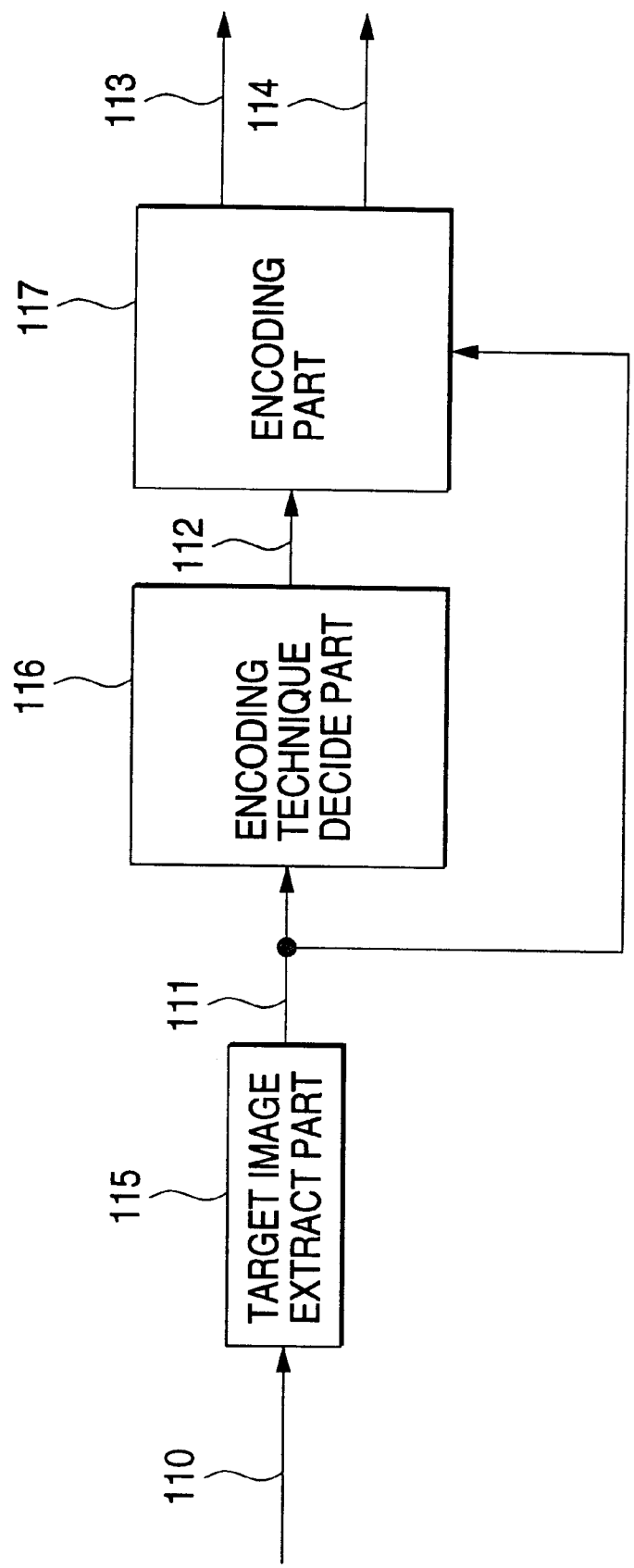
FIG. 18 is a block diagram of the structure of an embodiment 16 of an image encoding system according to an embodiment 16 of the invention.

Next, description will be given below of an embodiment 16 of an image encoding system according to the invention. The present embodiment 16, as shown in FIG. 18, includes a target extract part 115, an encoding technique decide part 116, and an encoding part 117.

According to the embodiment 16, an input image signal 110 is input into the target extract part 115, in which a plurality of target images forming a screen are separated and extracted from the input image signal 110. The extracted target images 111 are then transmitted to the encoding technique decide part 116. Responsive to this, the encoding technique decide part 116 selects out of a plurality of encoding techniques an encoding technique which is suitable for the target images 111 input therein, and then outputs a select signal 112.

In particular, the optimum encoding technique is found in accordance with the complexity or kinds of the picture patterns of the target images. And, it is also effective that the amounts of the respective pieces of information produced after the target images are encoded are compared with each other to thereby select the encoding technique that gives the minimum information amount. In the case of a character picture image, since the face part thereof is the most important, it is also effective to apply a model base encoding technique which can match a face model to a face image extracted as a target image to thereby presume the change of expression of the face and the motion of the head. On the other hand, in the area of a background image including a nature image and the like, it is suitable to employ an orthogonal transformation encoding technique which has been used conventionally.

Figure 19:
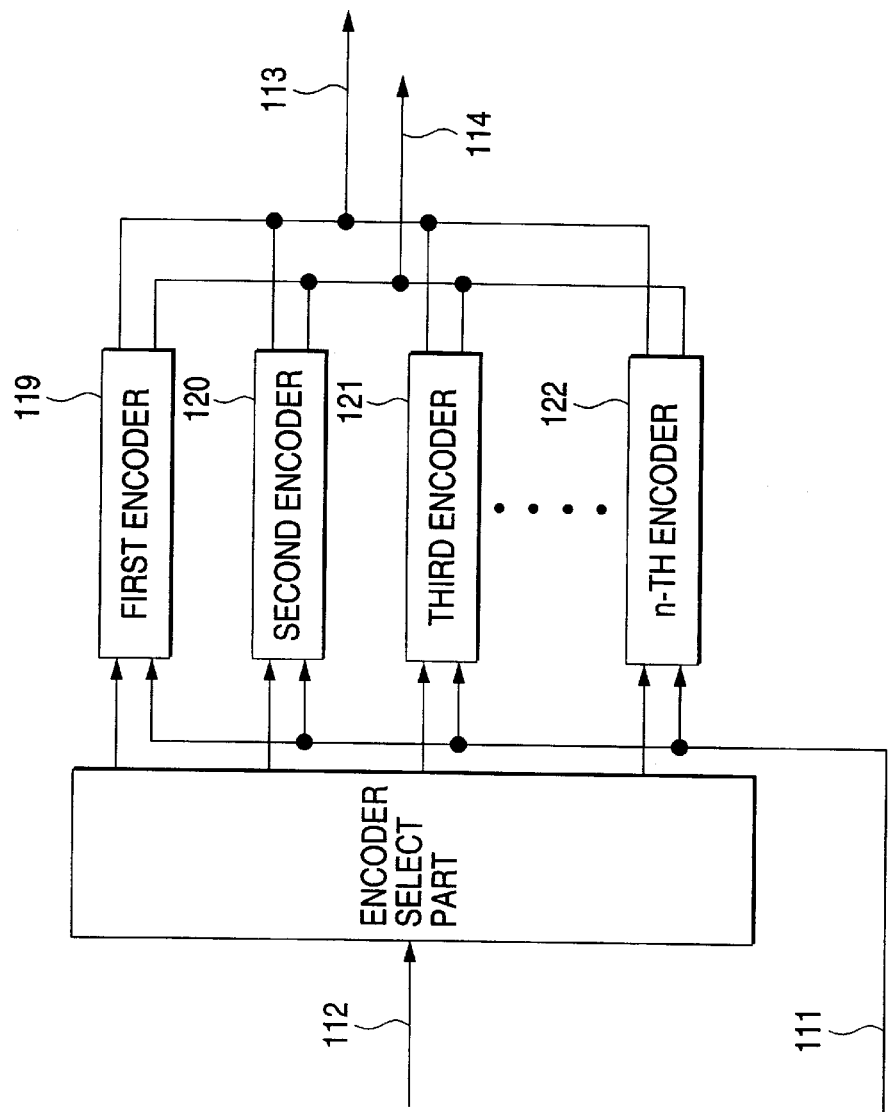
FIG. 19 is a block diagram of an example of the structure of an encoding part.

Now, the select signal 112 decided by the encoding technique decide part 116 is input to the encoding part 117. In the encoding part 117, as shown in FIG. 19, an encoder which is used to execute an encoding technique specified by the select signal 112 is selected out of n pieces of encoders (119–122), before the target images are encoded. After the target images are encoded, the encoding part 117 outputs not only the encoding information 113 that is obtained as the result of the above encoding operation but also the information 114 that represents a decoding technique for decoding the encoded target images.

As mentioned above, according to the embodiment 16, a plurality of target images included in an input image are extracted, an encoding technique suitable for the extracted target images is selected, and, after completion of the encoding operation, there are output the encoding information as well as the information on a decoding technique to decode the target images. Thanks to this, it is possible to improve the quality of the images when compared with a case in which the images are simply encoded and it is also possible to realize effective operations such as an operation to change the image quality according to the target images and other similar operations.

Embodiment 17

Figure 20:
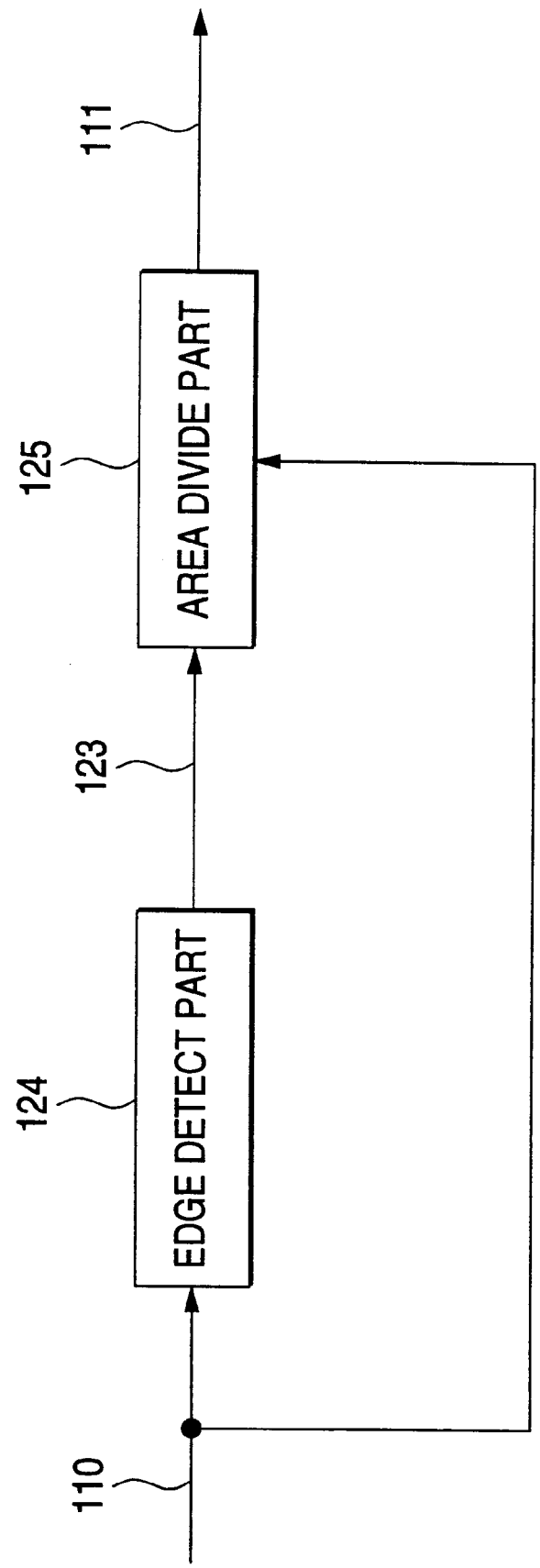
FIG. 20 is a block diagram of an example of the structure of a target image extract part.

Next, description will be given below of an embodiment 17 of an image encoding system according to the invention. The present embodiment 17 relates to the embodiment 16 shown in FIGS. 18 and 19 and, in FIG. 20, there is shown the structure of a target extract part which is employed in the present embodiment 17. The target extract part includes an edge detect part 124 and an area divide part 125. In particular, the edge detect part 124 detects edges contained in the input image information 110, while the area divide part 125 extracts the area images of the target images from the position information 123 on the thus detected edges and the input image information 110, and then outputs the target images 111.

Figure 21:
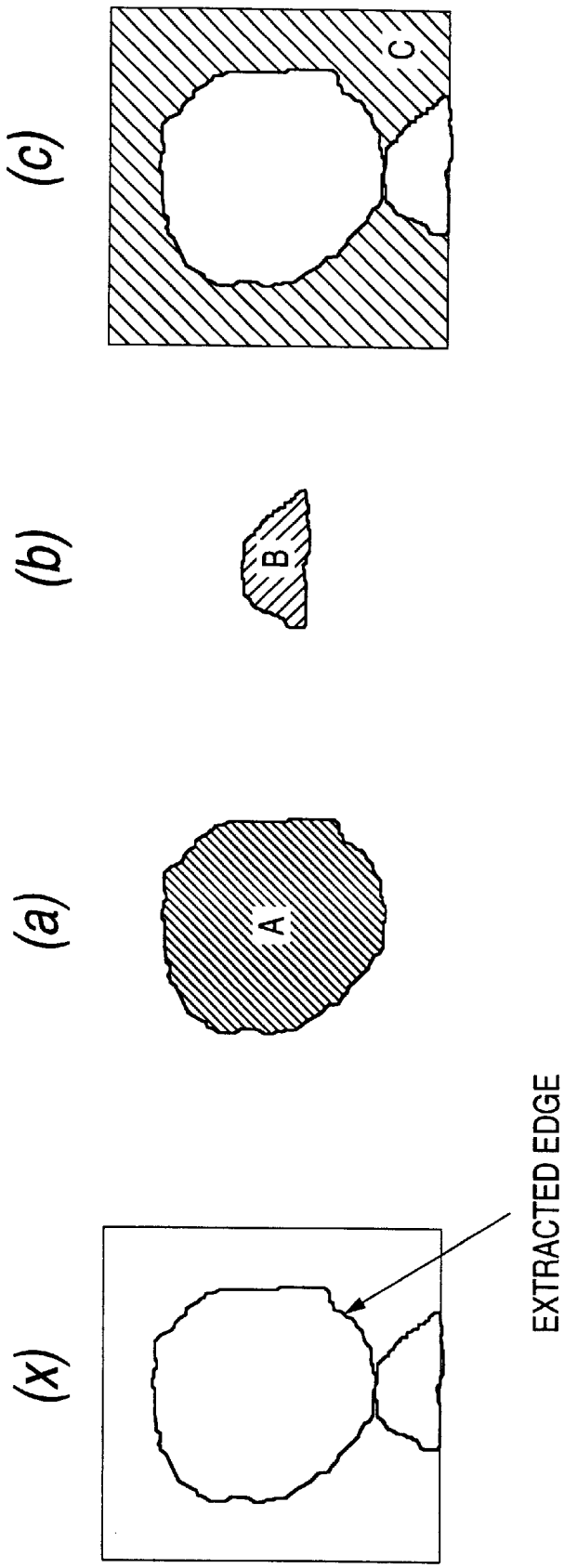
FIG. 21 is an explanatory view of the output results of the target image extract part.
Figure 22:
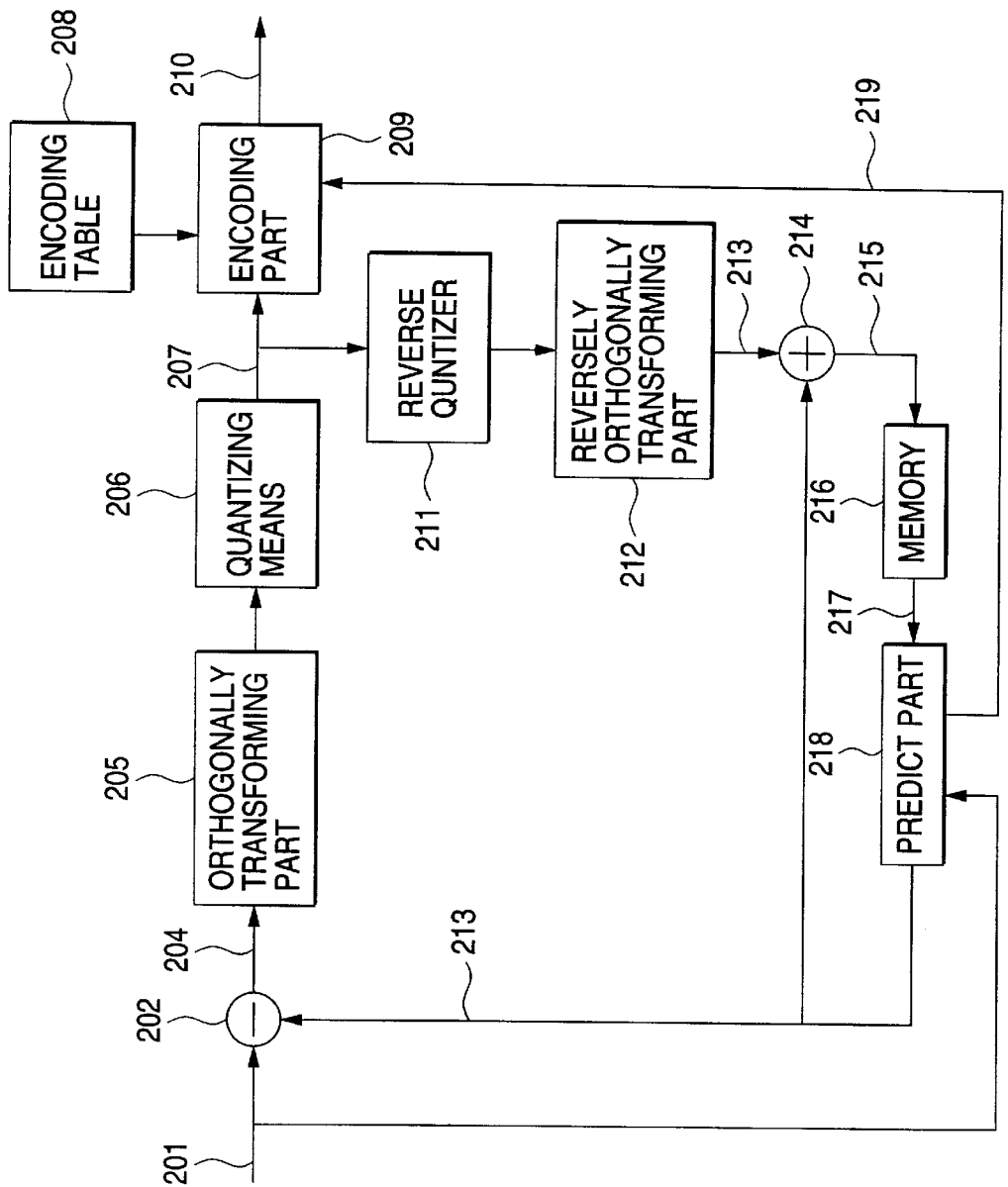
FIG. 22 is a block diagram of the structure of a conventional encoding system.

For example, in FIG. 21, there is shown a case in which area images A, B and C are extracted in the target extract part. In this case, the area image A represents a character head part, the area image B represents a character neck part, and the area image C represents a background image, respectively. That is, these three area images are to be encoded as the target images. Here, the area images can be easily divided and extracted by use of a conventional technique, provided that the edges can be extracted accurately to a certain extent.

As described above, the present image encoding system comprises: target image extract means composed of an edge detector for detecting the edge information of the input image, and an area divide device for dividing the area of the input image according to the detected edge information to thereby obtain a plurality of area divisional images; encoding technique decide means composed of a statistical property detector for detecting the statistical properties of the target images, and encoding technique decide device for outputting encoder select information according to the detected image statistical property information; and, encoding means composed of a plurality of encoders, and encoder select means for inputting the encoder select information therein to thereby select an encoder. According to this structure, since the area division is executed in accordance with the edge information, the area division can be achieved with high accuracy. Also, since the encoding technique is decided in accordance with the statistical properties of the image, the selection of the encoding technique can be made with high efficiency.

According to the first aspect of the invention, since the coefficients after transformed orthogonally are re-arranged in a plurality of scan sequences and the two or more outputs of the transformed coefficients are encoded using a plurality of encoding tables, it is possible to execute an encoding processing which is suitable for the local characteristics of the image signal and, especially when the transformed coefficients are encoded together with a plurality of coefficient values or encoding end signals in the form of variable-length codes, it is possible to perform an encoding processing in which the incidence probabilities of the codes thereof are optimized, which in turn makes it possible to perform an encoding processing with high efficiency.

According to the second aspect of the invention, because a difference image which is the predictive result of the motion compensation of an already encoded image is encoded as an input signal, an encoding efficiency can be improved further.

According to the third aspect of the invention, the quantized transformed coefficients are scanned and encoded according to the combinations of a plurality of scan sequences with a plurality of encoding tables to thereby provide the plurality of encoded outputs, then the plurality of encoded outputs are all calculation processed to thereby provide their respective code amounts, and, out of the above-mentioned combinations, there is selected a combination of a scan sequence and an encoding which shows the minimum code amount, whereby the highest encoding efficiency can be obtained regardless of the kinds or characteristics of the input signals.

According to the fourth aspect of the invention, a scan sequence and an encoding table are selected adaptively in accordance with the level distributions of the coefficients after they are transformed orthogonally, so that an encoding efficiency can be improved according to the characteristics of the input signals.

According to the fifth aspect of invention, a scan sequence is selected adaptively in accordance with the level distributions of the coefficients after they are transformed orthogonally, the transformed coefficients are scanned according to the selected scan sequence and are then encoded using a plurality of encoding tables, the encoded outputs are all calculation processed to thereby provide a plurality of code amounts, and then there is selected an encoding table which gives the minimum code amount, so that an encoding efficiency can be improved according to the characteristics of the input signals with less pieces of hardware when compared with the fourth aspect of the invention.

According to the sixth aspect of the invention, an encoding table is selected in accordance with the level distributions of the coefficients after they are transformed orthogonally, the transformed coefficients are scanned according to a plurality of scan sequences and are then encoded using the selected encoding tables, the encoded outputs are all calculation processed to thereby provide a plurality of code amounts, and then there is selected an encoding table which gives the minimum code amount, whereby an encoding efficiency can be improved according to the characteristics of the input signals with less pieces of hardware when compared with the fourth aspect of the invention.

According to the seventh aspect of the invention, by selecting a scan sequence and an encoding table adaptively in accordance with a quantizing step size to be used in a quantizing part, it is possible to improve an encoding efficiency with respect to a given quantizing step size.

According to the eighth aspect of the invention, a scan sequence is selected adaptively in accordance with a quantizing step size to be used in a quantizing part, the quantized transformed coefficients are scanned according to the thus selected scan sequence and are then encoded using a plurality of encoding tables to thereby obtain a plurality of encoded outputs, the encoded outputs are all calculation processed to thereby provide a plurality of code amounts, and then there is selected an encoding table which gives the minimum code amount, so that it is possible to improve an encoding efficiency with respect to a given quantizing step size with less pieces of hardware when compared with the fifth aspect of the invention.

According to the ninth aspect of the invention, an encoding table is selected in accordance with a quantizing step size to be used in a quantizing part, the transformed coefficients are scanned according to a plurality of scan sequences and are then encoded using the thus selected encoding table, the encoded outputs are all calculation processed to thereby provide a plurality of code amounts, and then there is selected a scan sequence which gives the minimum code amount, so that it is possible to improve an encoding efficiency with respect to the given quantizing step size with less pieces of hardware when compared with the fifth aspect of the invention.

According to the tenth aspect of the invention, by selecting a scan sequence and an encoding table are selected adaptively in accordance with a motion vector which is the output obtained when the motion of an encoded image is searched for compensation thereof, it is possible to improve an encoding efficiency with respect to the motion of the encoded image.

According to the eleventh aspect of the invention, a scan sequence is selected adaptively based on a motion vector which is the output obtained when the motion of an encoded image is searched for compensation thereof, the quantized transformed coefficients are scanned using the thus selected scan sequence and are then encoded using a plurality of encoding tables to provide a plurality of encoded data, the encoded outputs are all calculation processed to thereby provide a plurality of code amounts, and then there is selected an encoding table which shows the smallest code amount, whereby it is possible to improve an encoding efficiency with respect to the motion of the encoded image with less pieces of hardware when compared with the tenth aspect of the invention.

According to the twelfth aspect of the invention, an encoding table is selected adaptively based on a motion vector which is the output obtained when the motion of an encoded image is searched for compensation thereof, the quantized transformed coefficients are scanned using a plurality of scan sequences and are then encoded using the thus selected encoding table to thereby provide a plurality of encoding outputs, the encoded outputs are all calculation processed to thereby provide a plurality of code amounts, and then there is selected a scan sequence which shows the smallest code amount, whereby it is possible to improve an encoding efficiency with respect to the motion of the encoded image with less pieces of hardware when compared with the tenth aspect of the invention.

According to the thirteenth aspect of the invention, by selecting a scan sequence and an encoding table adaptively in accordance with a block encoding type, it is possible to improve an encoding efficiency with respect the block encoding type.

According to the fourteenth aspect of the invention, a scan sequence is selected adaptively in accordance with a block encoding type, the quantized transformed coefficients are scanned using the thus selected scan sequence and are then encoded using a plurality of encoding tables to provide a plurality of encoded outputs, the encoded outputs are all calculation processed to thereby provide a plurality of code amounts, and then there is selected an encoding table which shows the smallest code amount, whereby it is possible to improve an encoding efficiency with respect to the block encoding type with less pieces of hardware when compared with the thirteenth aspect of the invention.

According to the fifteenth aspect of the invention, an encoding table is selected in accordance with a block encoding type, the quantized transformed coefficients are scanned according to a plurality of scan sequences and are then encoded using the thus selected encoding table to thereby provide a plurality of encoded outputs, the encoded outputs are all calculation processed to thereby provide a plurality of code amounts, and then there is selected a scan sequence which shows the smallest code amount, whereby it is possible to improve an encoding efficiency with respect to the block encoding type with less pieces of hardware when compared with the thirteenth aspect of the invention.

According to the sixteenth aspect of the invention, in a plurality of scan sequences which are used to scan the coefficients after they are transformed orthogonally, there is included a scan sequence according to which the transformed coefficients in a block are arranged from the lower frequency components thereof toward the higher frequency components thereof, so that the transformed coefficients can be scanned efficiently.

According to the seventeenth aspect of the invention, there are extracted a plurality of target images included in an input image, there is applied an encoding technique which is suitable for the extracted target images, and there are output not only the encoding information as to the thus encoded target images but also the information representing a decoding technique for decoding the encoded target images, whereby the image quality can be improved when compared with a case in which the target images are simply encoded and also it is possible to carry out other operations such as an operation to change the image quality according to the target images and other similar operations.

According to the eighteenth aspect of the invention, an image encoding system comprises target image extract means composed of an edge detector for detecting the edge information of an input image and an area divider for dividing the area of the input image according to the detected edge information, encoding technique decide means composed of a statistical property detector for detecting the statistical properties of the target images and an encoding technique decide device for outputting encoder select information in accordance with the detected statistical property information, and encoder select means composed of a plurality of encoders and encoder select means for inputting the encoder select information therein to select a proper encoder. That is, since the area of the image is divided in accordance with the edge information, it is possible to realize a high-accuracy area dividing operation, and, since an encoding technique is decided in accordance with the statistical properties of the image, it is possible to select a highly efficient encoding technique.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. An image encoding system, comprising:
   (a) blocking means for dividing an input image signal into blocks each consisting of M pixels×N lines;
   (b) transforming means for transforming the outputs of said blocking means, that is, said blocks into a plurality of transformed coefficients;
   (c) quantizing means for quantizing the outputs of said transforming means, that is, said transformed coefficients in accordance with a given quantizing step size;
   (d) scan means for re-arranging or scanning the outputs of said quantizing means, that is, said quantized transformed coefficients into two or more kinds of scan sequences;
   (e) encoding means for encoding the outputs of said scan means, that is, said scanned coefficients together with a plurality of coefficient values or encoding end signals using two or more kinds of encoding tables to thereby generate encoded data; and
   (f) select means for selecting a combination of a scan sequence and an encoding table in accordance with not only said two or more kinds of scan sequences generated by said scan means but also two or more kinds of encoded data generated by said encoding means,
   wherein after said transformed coefficients are scanned and encoded according to combinations of a plurality of scan sequences with a plurality of encoding tables to provide a plurality of encoded outputs and said plurality of encoded outputs are processed to thereby obtain their respective code amounts, said select means selects out of said combinations a combination of a scan sequence with an encoding table that gives a minimum code amount.

2. An image encoding system as set forth in claim 1, wherein said blocking means for dividing said input image signal into said block units searches an already encoded image for the motion thereof to find a motion vector and compensates said motion of said encoded image using said motion vector to thereby find a predictive block, and thereafter outputs a difference between said encoded image and said predictive block.

3. An image encoding system as set forth in claim 1, wherein said scan means for re-arranging said quantized transformed coefficients into a plurality of scan sequences includes a scan sequence in which said transformed coefficients can be re-arranged in the sequence of the lower frequency components thereof toward the higher frequency components thereof.

4. An image encoding system, comprising:
   (a) blocking means for dividing an input image signal into blocks each consisting of M pixels×N lines;
   (b) transforming means for transforming the outputs of said blocking means, that is, said blocks into a plurality of transformed coefficients;
   (c) quantizing means for quantizing the outputs of said transforming means, that is, said transformed coefficients in accordance with a given quantizing step size;
   (d) scan means for re-arranging or scanning the outputs of said quantizing means, that is, said quantized transformed coefficients into two or more kinds of scan sequences;
   (e) encoding means for encoding the outputs of said scan means, that is, said scanned coefficients together with a plurality of coefficient values or encoding end signals using two or more kinds of encoding tables to thereby generate encoded data; and (f) select means for selecting a combination of a scan sequence and an encoding table in accordance with not only said two or more kinds of scan sequences generated by said scan means but also two or more kinds of encoded data generated by said encoding means, wherein said select means for selecting a scan sequence and an encoding table switches said scan sequences and encoding tables adaptively in accordance with the level distributions of the outputs of said transforming means, that is, said transformed coefficients.

5. An image encoding system, comprising:

(a) blocking means for dividing an input image signal into blocks each consisting of M pixels×N lines;

(b) transforming means for transforming the outputs of said blocking means, that is, said blocks into a plurality of transformed coefficients;

(c) quantizing means for quantizing the outputs of said transforming means, that is, said transformed coefficients in accordance with a given quantizing step size;

(d) scan means for re-arranging or scanning the outputs of said quantizing means, that is, said quantized transformed coefficients into two or more kinds of scan sequences;

(e) encoding means for encoding the outputs of said scan means, that is, said scanned coefficients together with a plurality of coefficient values or encoding end signals using two or more kinds of encoding tables to thereby generate encoded data; and (f) select means for selecting a combination of a scan sequence and an encoding table in accordance with not only said two or more kinds of scan sequences generated by said scan means but also two or more kinds of encoded data generated by said encoding means, wherein said select means for selecting a scan sequence and an encoding table selects a scan sequence adaptively in accordance with the level distributions of the outputs of said transforming means, that is, said transformed coefficients and, after said transformed coefficients are scanned according to said selected scan sequence and are then encoded according to a plurality of encoding tables to thereby provide a plurality of encoded outputs and said plurality of encoded outputs are all processed to thereby provide their respective code amounts, selects an encoding table which gives the minimum code amount.

6. An image encoding system, comprising:

(a) blocking means for dividing an input image signal into blocks each consisting of M pixels×N lines;

(b) transforming means for transforming the outputs of said blocking means, that is, said blocks into a plurality of transformed coefficients;

(c) quantizing means for quantizing the outputs of said transforming means, that is, said transformed coefficients in accordance with a given quantizing step size;

(d) scan means for re-arranging or scanning the outputs of said quantizing means, that is, said quantized transformed coefficients into two or more kinds of scan sequences;

(e) encoding means for encoding the outputs of said scan means, that is, said scanned coefficients together with a plurality of coefficient values or encoding end signals using two or more kinds of encoding tables to thereby generate encoded data; and (f) select means for selecting a combination of a scan sequence and an encoding table in accordance with not only said two or more kinds of scan sequences generated by said scan means but also two or more kinds of encoded data generated by said encoding means, wherein said select means for selecting a scan sequence and an encoding table selects an encoding table adaptively in accordance with the level distributions of the outputs of said transforming means, that is, said transformed coefficients, and, after said transformed coefficients are encoded according to said selected encoding table and two or more kinds of scan sequences to thereby provide a plurality of encoded outputs and said plurality of encoded outputs are all processed to thereby provide their respective code amounts, selects an encoding table which gives the minimum code amount.

7. An image encoding system, comprising:

(a) blocking means for dividing an input image signal into blocks each consisting of M pixels×N lines;

(b) transforming means for transforming the outputs of said blocking means, that is, said blocks into a plurality of transformed coefficients;

(c) quantizing means for quantizing the outputs of said transforming means, that is, said transformed coefficients in accordance with a given quantizing step size;

(d) scan means for re-arranging or scanning the outputs of said quantizing means, that is, said quantized transformed coefficients into two or more kinds of scan sequences;

(e) encoding means for encoding the outputs of said scan means, that is, said scanned coefficients together with a plurality of coefficient values or encoding end signals using two or more kinds of encoding tables to thereby generate encoded data; and (f) select means for selecting a combination of a scan sequence and an encoding table in accordance with not only said two or more kinds of scan sequences generated by said scan means but also two or more kinds of encoded data generated by said encoding means, wherein said select means for selecting a scan sequence and an encoding table switches said scan sequences and encoding tables adaptively in accordance with a given quantizing step size to be used in said quantizing means.

8. An image encoding system, comprising:

(a) blocking means for dividing an input image signal into blocks each consisting of M pixels×N lines;

(b) transforming means for transforming the outputs of said blocking means, that is, said blocks into a plurality of transformed coefficients;

(c) quantizing means for quantizing the outputs of said transforming means, that is, said transformed coefficients in accordance with a given quantizing step size;

(d) scan means for re-arranging or scanning the outputs of said quantizing means, that is, said quantized transformed coefficients into two or more kinds of scan sequences;

(e) encoding means for encoding the outputs of said scan means, that is, said scanned coefficients together with a plurality of coefficient values or encoding end signals using two or more kinds of encoding tables to thereby generate encoded data; and (f) select means for selecting a combination of a scan sequence and an encoding table in accordance with not only said two or more kinds of scan sequences generated by said scan means but also two or more kinds of encoded data generated by said encoding means, wherein said select means for selecting a scan sequence and an encoding table selects a scan sequence adaptively in accordance with a given quantizing step size to be used in said quantizing means, and, after said transformed coefficients are encoded according to said selected scan sequence and according to a plurality of encoding tables to thereby provide a plurality of encoded outputs and said plurality of encoded outputs are all processed to thereby provide their respective code amounts, selects an encoding table which gives the minimum code amount.

9. An image encoding system, comprising:
(a) blocking means for dividing an input image signal into blocks each consisting of M pixels×N lines;
(b) transforming means for transforming the outputs of said blocking means, that is, said blocks into a plurality of transformed coefficients;
(c) quantizing means for quantizing the outputs of said transforming means, that is, said transformed coefficients in accordance with a given quantizing step size;
(d) scan means for re-arranging or scanning the outputs of said quantizing means, that is, said quantized transformed coefficients into two or more kinds of scan sequences;
(e) encoding means for encoding the outputs of said scan means, that is, said scanned coefficients together with a plurality of coefficient values or encoding end signals using two or more kinds of encoding tables to thereby generate encoded data; and
(f) select means for selecting a combination of a scan sequence and an encoding table in accordance with not only said two or more kinds of scan sequences generated by said scan means but also two or more kinds of encoded data generated by said encoding means, wherein said select means for selecting a scan sequence and an encoding table selects an encoding table adaptively in accordance with a given quantizing step size to be used in said quantizing means, and, after said transformed coefficients are encoded according to said selected encoding table and two or more kinds of scan sequences to thereby provide a plurality of encoded outputs and said plurality of encoded outputs are all processed to thereby provide their respective code amounts, selects an encoding table which gives the minimum code amount.

10. An image encoding system, comprising:
(a) blocking means for dividing an input image signal into blocks each consisting of M pixels×N lines;
(b) transforming means for transforming the outputs of said blocking means, that is, said blocks into a plurality of transformed coefficients;
(c) quantizing means for quantizing the outputs of said transforming means, that is, said transformed coefficients in accordance with a given quantizing step size;
(d) scan means for re-arranging or scanning the outputs of said quantizing means, that is, said quantized transformed coefficients into two or more kinds of scan sequences;
(e) encoding means for encoding the outputs of said scan means, that is, said scanned coefficients together with a plurality of coefficient values or encoding end signals using two or more kinds of encoding tables to thereby generate encoded data; and
(f) select means for selecting a combination of a scan sequence and an encoding table in accordance with not only said two or more kinds of scan sequences generated by said scan means but also two or more kinds of encoded data generated by said encoding means, wherein said blocking means for dividing said input image signal into said block units searches an already encoded image for the motion thereof to find a motion vector and compensates said motion of said encoded image using said motion vector to thereby find a predictive block, and thereafter outputs a difference between said encoded image and said predictive block, wherein said select means for selecting a scan sequence and an encoding table switches said scan sequences and encoding tables adaptively in accordance with said motion vector to be searched for compensation of the motion of said encoded image.

11. An image encoding system, comprising:
(a) blocking means for dividing an input image signal into blocks each consisting of M pixels×N lines;
(b) transforming means for transforming the outputs of said blocking means, that is, said blocks into a plurality of transformed coefficients;
(c) quantizing means for quantizing the outputs of said transforming means, that is, said transformed coefficients in accordance with a given quantizing step size;
(d) scan means for re-arranging or scanning the outputs of said quantizing means, that is, said quantized transformed coefficients into two or more kinds of scan sequences;
(e) encoding means for encoding the outputs of said scan means, that is, said scanned coefficients together with a plurality of coefficient values or encoding end signals using two or more kinds of encoding tables to thereby generate encoded data; and
(f) select means for selecting a combination of a scan sequence and an encoding table in accordance with not only said two or more kinds of scan sequences generated by said scan means but also two or more kinds of encoded data generated by said encoding means, wherein said blocking means for dividing said input image signal into said block units searches an already encoded image for the motion thereof to find a motion vector and compensates said motion of said encoded image using said motion vector to thereby find a predictive block, and thereafter outputs a difference between said encoded image and said predictive block, wherein said select means for selecting a scan sequence and an encoding table selects a scan sequence adaptively in accordance with said motion vector to be searched for compensation of the motion of said encoded image and, after said transformed coefficients are encoded according to said selected scan sequence and two or more kinds of encoding tables to thereby provide a plurality of encoded outputs and said plurality of encoded outputs are all processed to thereby provide their respective code amounts, selects an encoding table which gives the minimum code amount.

12. An image encoding system, comprising:
(a) blocking means for dividing an input image signal into blocks each consisting of M pixels×N lines;
(b) transforming means for transforming the outputs of said blocking means, that is, said blocks into a plurality of transformed coefficients;
(c) quantizing means for quantizing the outputs of said transforming means, that is, said transformed coefficients in accordance with a given quantizing step size;

(d) scan means for re-arranging or scanning the outputs of said quantizing means, that is, said quantized transformed coefficients into two or more kinds of scan sequences;

(e) encoding means for encoding the outputs of said scan means, that is, said scanned coefficients together with a plurality of coefficient values or encoding end signals using two or more kinds of encoding tables to thereby generate encoded data; and (f) select means for selecting a combination of a scan sequence and an encoding table in accordance with not only said two or more kinds of scan sequences generated by said scan means but also two or more kinds of encoded data generated by said encoding means, wherein said blocking means for dividing said input image signal into said block units searches an already encoded image for the motion thereof to find a motion vector and compensates said motion of said encoded image using said motion vector to thereby find a predictive block, and thereafter outputs a difference between said encoded image and said predictive block, wherein said select means for selecting a scan sequence and an encoding table selects an encoding table adaptively in accordance with said motion vector to be searched for compensation of the motion of said encoded image and, after said transformed coefficients are encoded according to said selected encoding table and two or more kinds of scan sequences and are then encoded according to said selected encoding table to thereby provide a plurality of encoded outputs and said plurality of encoded outputs are all processed to thereby provide their respective code amounts, selects a scan sequence which gives the minimum code amount.

13. An image encoding system, comprising:

(a) blocking means for dividing an input image signal into blocks each consisting of M pixels×N lines;

(b) transforming means for transforming the outputs of said blocking means, that is, said blocks into a plurality of transformed coefficients;

(c) quantizing means for quantizing the outputs of said transforming means, that is, said transformed coefficients in accordance with a given quantizing step size;

(d) scan means for re-arranging or scanning the outputs of said quantizing means, that is, said quantized transformed coefficients into two or more kinds of scan sequences;

(e) encoding means for encoding the outputs of said scan means, that is, said scanned coefficients together with a plurality of coefficient values or encoding end signals using two or more kinds of encoding tables to thereby generate encoded data; and (f) select means for selecting a combination of a scan sequence and an encoding table in accordance with not only said two or more kinds of scan sequences generated by said scan means but also two or more kinds of encoded data generated by said encoding means, wherein said select means for selecting a scan sequence and an encoding table switches said scan sequences and encoding tables adaptively in accordance with the encoding types of said encoding blocks.

14. An image encoding system, comprising:

(a) blocking means for dividing an input image signal into blocks each consisting of M pixels×N lines;

(b) transforming means for transforming the outputs of said blocking means, that is, said blocks into a plurality of transformed coefficients;

(c) quantizing means for quantizing the outputs of said transforming means, that is, said transformed coefficients in accordance with a given quantizing step size;

(d) scan means for re-arranging or scanning the outputs of said quantizing means, that is, said quantized transformed coefficients into two or more kinds of scan sequences;

(e) encoding means for encoding the outputs of said scan means, that is, said scanned coefficients together with a plurality of coefficient values or encoding end signals using two or more kinds of encoding tables to thereby generate encoded data; and (f) select means for selecting a combination of a scan sequence and an encoding table in accordance with not only said two or more kinds of scan sequences generated by said scan means but also two or more kinds of encoded data generated by said encoding means, wherein said select means for selecting a scan sequence and an encoding table selects a scan sequence adaptively in accordance with the encoding types of said encoding blocks, and, after said transformed coefficients are encoded according to said selected scan sequence and two or more kinds of encoding tables to thereby provide a plurality of encoded outputs and said plurality of encoded outputs are all processed to thereby provide their respective code amounts, selects an encoding table which gives the minimum code amount.

15. An image encoding system, comprising:

(a) blocking means for dividing an input image signal into blocks each consisting of M pixels×N lines;

(b) transforming means for transforming the outputs of said blocking means, that is, said blocks into a plurality of transformed coefficients;

(c) quantizing means for quantizing the outputs of said transforming means, that is, said transformed coefficients in accordance with a given quantizing step size;

(d) scan means for re-arranging or scanning the outputs of said quantizing means, that is, said quantized transformed coefficients into two or more kinds of scan sequences;

(e) encoding means for encoding the outputs of said scan means, that is, said scanned coefficients together with a plurality of coefficient values or encoding end signals using two or more kinds of encoding tables to thereby generate encoded data; and (f) select means for selecting a combination of a scan sequence and an encoding table in accordance with not only said two or more kinds of scan sequences generated by said scan means but also two or more kinds of encoded data generated by said encoding means, wherein said select means for selecting a scan sequence and an encoding table selects an encoding table adaptively in accordance with the encoding types of said encoding blocks, and, after said transformed coefficients are encoded according to said selected encoding table and two or more kinds of scan sequences to thereby provide a plurality of encoded outputs and said plurality of encoded outputs are all processed to thereby provide their respective code amounts, selects a scan sequence which gives the minimum code amount.

16. An image encoding system, comprising:

target image extract means for extracting a plurality of target images contained in an input image;

encoding technique decide means for deciding an encoding technique with respect to each of said extracted target images; and encoding means for encoding each of said extracted target images according to said decided encoding technique and for outputting not only encoding information as to said encoding processing performed on said target images but also information indicating a decoding technique for decoding each of said encoded target images, wherein said target image extract means includes an edge detector for detecting the edge information of said input image and an area divider for dividing the area of said input image in accordance with said detected edge information to thereby provide a plurality of area divisional images, said encoding technique decide means including
- a statistical property detector for detecting the image statistical properties of said target images, and
- an encoder decide device for outputting encoder select information in accordance with said detected statistical property information, said encoding means including a plurality of encoders and encoder select means for inputting therein said encoder select information to select one of said encoders for each of said target images.

17. A method for encoding an image, comprising the steps of:

dividing an input image signal into blocks having M pixels×N lines;

transforming the blocks into a plurality of transform coefficients;

quantizing the transform coefficients in accordance with a given quantizing step size;

a scanning step, said scanning step re-arranging or scanning the quantized transformed coefficients into two or more kinds of scan sequences;

encoding the scanned coefficients together with a plurality of coefficient values or encoding end signals using two or more kinds of encoding tables to thereby generate encoded data; and a selecting step, said selecting step selecting a combination of a scan sequence and an encoding table in accordance with not only the two or more kinds of scan sequences generated by said scanning step but also two or more kinds of encoded data generated by said encoding step, wherein after said transformed coefficients are scanned and encoded according to combinations of a plurality of scan sequences with a plurality of encoding tables to provide a plurality of encoded outputs and said plurality of encoded outputs are processed to thereby obtain their respective code amounts, said selecting step selects out of said combinations a combination of a scan sequence with an encoding table that results in a minimum code amount.

18. A method for encoding an image, comprising:

extracting a plurality of target images contained in an input image;

deciding an encoding technique with respect to each of the extracted target images; and encoding each of said extracted target images according to the encoding technique selected by said deciding step and outputting not only encoding information as to the encoding processing performed on the target images but also information indicating a decoding technique for decoding each of the encoded target images, said extracting step including
- detecting edge information of said input image,
- dividing the area of said input image in accordance with said detected edge information to thereby provide a plurality of area divisional images;

said deciding step including
- detecting the image statistical properties of said target images, and
- outputting encoder select information in accordance with said detected statistical property information;

said encoding step including a plurality of encoding substeps, said encoding step inputting said encoder select information to select one of said encoding substeps for each of said target images.

* * * * *